US011943188B1

(12) United States Patent
Rathi

(10) Patent No.: US 11,943,188 B1
(45) Date of Patent: Mar. 26, 2024

(54) RESTRICTING MESSAGE NOTIFICATIONS AND CONVERSATIONS BASED ON DEVICE TYPE, MESSAGE CATEGORY, AND TIME PERIOD

(71) Applicant: Microsoft Technology Licensing, LLC, Redmond, WA (US)

(72) Inventor: Hitesh Rathi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/151,099

(22) Filed: Jan. 6, 2023

(51) Int. Cl.
*H04L 51/212* (2022.01)
*H04L 51/224* (2022.01)

(52) U.S. Cl.
CPC .......... *H04L 51/212* (2022.05); *H04L 51/224* (2022.05)

(58) Field of Classification Search
CPC ............................ H04L 51/212; H04L 51/224
See application file for complete search history.

(56) References Cited

U.S. PATENT DOCUMENTS

| | | | |
|---|---|---|---|
| 8,463,242 B2 | 6/2013 | Scott et al. | |
| 8,775,538 B2 | 7/2014 | Heikes et al. | |
| 9,002,395 B2 | 4/2015 | Krukar | |
| 10,402,048 B1 | 9/2019 | Carman | |
| 11,212,769 B1 * | 12/2021 | Baker, Jr. | H04L 51/224 |
| 2005/0091269 A1 | 4/2005 | Gerber et al. | |
| 2008/0162642 A1 | 7/2008 | Bachiri et al. | |
| 2010/0179995 A1 | 7/2010 | Wang | |
| 2013/0166664 A1 | 6/2013 | May et al. | |
| 2014/0059142 A1 | 2/2014 | Gandhi et al. | |
| 2014/0181696 A1 | 6/2014 | Christensen et al. | |
| 2015/0056974 A1 | 2/2015 | Kim | |
| 2016/0197866 A1 | 7/2016 | Cha | |
| 2019/0075069 A1 * | 3/2019 | Kumar | H04L 51/222 |
| 2022/0368665 A1 * | 11/2022 | Walters | G06F 40/30 |
| 2023/0049885 A1 * | 2/2023 | Bakshi | H04W 4/025 |
| 2023/0115319 A1 * | 4/2023 | Aher | H04L 51/214 709/238 |
| 2023/0328147 A1 * | 10/2023 | Xin | H04L 51/224 709/224 |

OTHER PUBLICATIONS

"Use Focus on your iPhone or iPad", Retrieved From: https://support.apple.com/en-us/HT212608, Sep. 12, 2022, 5 Pages.

* cited by examiner

*Primary Examiner* — John M Macilwinen
*Assistant Examiner* — Jihad K Boustany
(74) *Attorney, Agent, or Firm* — Novo TechIP International PLLC

(57) ABSTRACT

A data processing system implements techniques for restricting which notifications and/or conversations are presented on a plurality of user devices associated with a user. Each user device is associated with a device category. The device categories are associated with time category information that associates each of a plurality of time periods with permitted device category information that indicates which categories of user devices associated with the user are permitted to present notifications that messages have been received for a particular time period and the categories of messages for which the notifications may be presented for that time period and/or which categories of conversations may be presented or hidden. The message category may be determined based on user input or by analyzing the message content with a machine learning model configured to predict the message category.

20 Claims, 26 Drawing Sheets

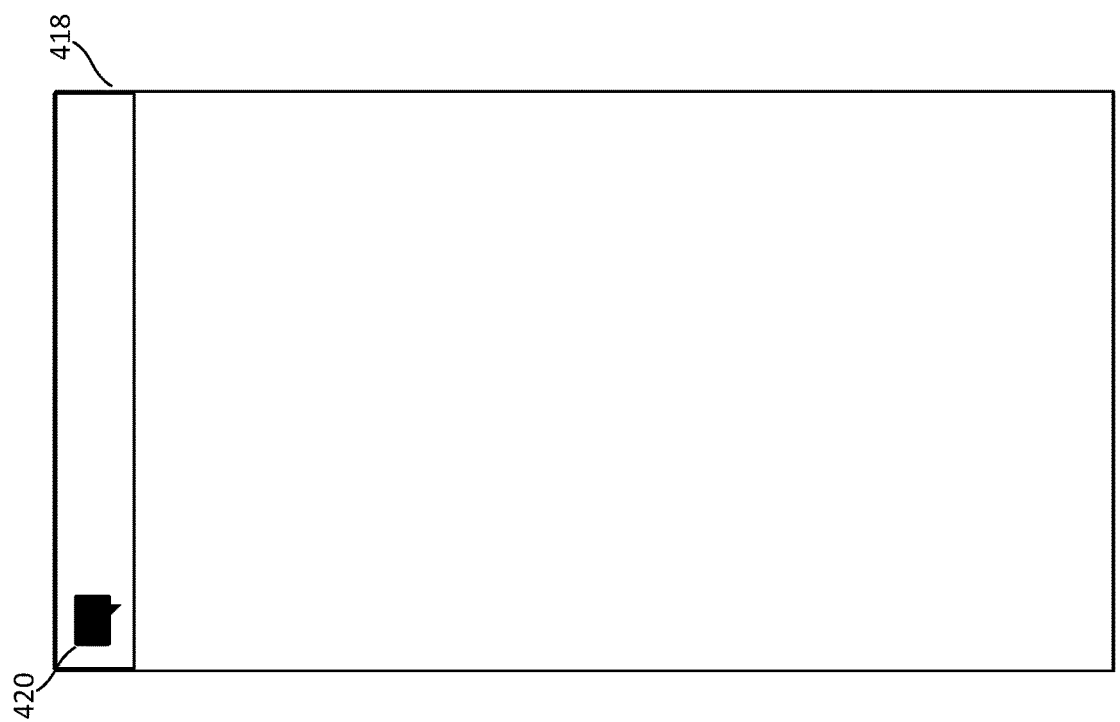

| User Identifier | Device Identifier | Device Category |
|---|---|---|
| User A | Work Laptop | Work Device |
| User A | Work Laptop | Work Device |
| User A | Work Laptop | Work Device |
| User A | Work Desktop | Work Device |
| User A | Work Desktop | Work Device |
| User A | Work Desktop | Work Device |
| User A | Mobile Phone | Hybrid Device |
| User A | Mobile Phone | Hybrid Device |
| User A | Mobile Phone | Hybrid Device |
| User A | Tablet | Personal Device |
| User A | Tablet | Personal Device |

FIG. 5A

| Time Category | Days | Hours | Message Category Permitted | Device Category Permitted |
|---|---|---|---|---|
| Work-Focus-Hours | M-T-W-Th-F | 09:00-11:00 PST | Work-Related-Urgent | Work Device |
| Work-Non-Focus-Hours | M-T-W-Th-F | 11:00-17:00 PST | Work-Related-ALL; Personal-Urgent | Work Device; Hybrid Device |
| Non-Work-Hours | M-T-W-Th-F | 17:00-09:00 PST | All Categories | All Categories |
| Non-Work-Hours | Sa-Su | All | Personal-ALL | All Categories |
| Non-Work-Quiet | Sa-Su | 10:00-12:00 PST | Personal-Urgent | All Categories |
| Default | All | All | All Categories | All Categories |

FIG. 5B

| Message Identifier | Message Category | Device Identifier |
|---|---|---|
| 00001 | Personal | Mobile Phone |
| 00002 | Personal-Urgent | Work Laptop |
| 00002 | Personal-Urgent | Work Desktop |
| 00003 | Personal | Mobile Phone |
| 00004 | Personal | Tablet |

FIG. 5C

| Time Category | Days | Hours | Message Category Permitted | Device Category Permitted | Hide Conversations | Delay Notifications |
|---|---|---|---|---|---|---|
| Work-Focus-Hours | M-T-W-Th-F | 09:00-11:00 PST | Work-Related-Urgent | Work Device | Yes | Yes |
| Work-Non-Focus-Hours | M-T-W-Th-F | 11:00-17:00 PST | Work-Related-ALL; Personal-Urgent | Work Device; Hybrid Device | Yes | No |
| Non-Work-Hours | M-T-W-Th-F | 17:00-09:00 PST | All Categories | All Categories | No | No |
| Non-Work-Hours | Sa-Su | All | Personal-ALL | All Categories | No | No |
| Non-Work-Quiet | Sa-Su | 10:00-12:00 PST | Personal-Urgent | All Categories | No | No |
| Default | All | All | All Categories | All Categories | No | No |

RESTRICTING MESSAGE NOTIFICATIONS AND CONVERSATIONS BASED ON DEVICE TYPE, MESSAGE CATEGORY, AND TIME PERIOD

BACKGROUND

A user may receive a large number of email messages, text messages, chat messages, and/or other types of messages on their user devices throughout the day. The user devices typically presents graphical, audible, and/or haptic notifications to alert the user that the messages have been received. However, receipt of such notifications is not always desired. The notifications may interrupt the user workflow or may be inappropriate at certain times. The user may wish to restrict which message notifications may be presented on different categories of their user devices based on the message category and the time period in which the message is received. However, current messaging platforms do not provide such fine-grained control over the notifications presented on the user devices. Hence, there is a need for improved systems and methods that provide fine-grained control over which notifications are presented to the user based on the message category, the category of each user device, and the time when the messages are received.

SUMMARY

An example data processing system according to the disclosure may include a processor and a machine-readable medium storing executable instructions. The instructions when executed cause the processor to perform operations including maintaining a data structure defining a relationship between identities of user devices associated with a user, a device category associated with each user device of the user devices, and a message category, and a message category and updating the data structure. Updating the data structure includes obtaining device category information, the device category information grouping a plurality of user devices associated with a first user into a plurality of categories, the device category information comprising a device identifier and a device category associated with each user device of the plurality of user devices; obtaining time category information, the time category information associating each time period among a plurality of time periods with permitted device category information and message category information, the permitted device category information indicating which categories of user devices are permitted to provide notification of received messages during the time period, and the message category information indicating which categories of messages from a plurality of message categories for which the notifications may be generated during the time period; receiving a first message for the first user at a first time; determining a first message category for the first message among the plurality of message categories; determining a first time category associated with the first message based on the first time; according to the data structure associated with the first user, determining a first subset of the plurality of user devices associated with a first device category are permitted to provide notifications that the first message has been received, the first subset of the plurality of user devices being associated with one or more categories of user devices permitted to provide notification of received messages of the first message category associated with the first time category; and causing the first subset of the plurality of user devices to present a first notification of the receipt of the first message.

An example data processing system according to the disclosure may include a processor and a machine-readable medium storing executable instructions. The instructions when executed cause the processor to perform operations including maintaining a data structure defining a relationship between user device associated with a user, a device category associated with the device, and a message category, and updating the data structure. Updating the data structure includes obtaining device category information at a user device, the device category information indicating that the user device is associated with a first category of user device among a plurality of user devices associated with a first user; obtaining time category information at the user device, the time category information associating each time period among a plurality of time periods with message category information, the message category information indicating for which message categories among a plurality of message categories the user device is permitted to display immediate notifications of received messages for the time period; receiving a first message for the first user at a first time; determining a first message category for the first message among the plurality of message categories; determining a first time category associated with the first message based on the first time; according to the data structure associated with the first user, determining that the user device is permitted to provide a notification that the first message has been received based on the first category of the user device, the first category of the user device indicating that the user device is permitted to provide notifications of received messages of the first message category associated with the first time category; and presenting a first notification of the receipt of the first message via a user interface of the user device.

An example data processing system according to the disclosure may include a processor and a machine-readable medium storing executable instructions. The instructions when executed cause the processor to perform operations including maintaining a data structure defining a relationship between identities of user devices associated with a user, a device category associated with each user device of the user devices, a message category, and a time category; and updating the data structure by obtaining device category information, the device category information grouping a plurality of user devices associated with a first user into a plurality of categories, the device category information comprising a device identifier and a device category associated with each user device of the plurality of user devices; obtaining time category information, the time category information associating each time period among a plurality of time periods with permitted device category information and message category information, the permitted device category information indicating which categories of user devices are permitted to provide notification of received messages during the time period, and the message category information indicating which categories of messages from a plurality of message categories for which the notifications may be generated during the time period; obtaining conversation information for a plurality of conversations associated with the user; determining a message category associated with each conversation of the plurality of conversations; determining a first time category associated with a first time; according to the data structure associated with the first user, determining a first subset of the plurality of conversations that are permitted to be presented on a first user device associated with the first user according to the first time category and a second subset of the plurality of conversations are not permitted to be presented on the first user device associated with the first user according to the first time category; causing the first subset of the plurality of conversations to be presented on the first user device; and causing the second subset of the plurality of conversations to be hidden on the first user device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A-4F are diagrams of an example user interfaces showing examples of notifications being selectively presented or hidden according to the techniques disclosed herein.

FIGS. 5A-5D are diagrams of an example data structure used to store configuration information for the techniques provided herein.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for restricting which notifications and/or conversations are presented on a user device are provided. These techniques address the technical problems associated with configuring which notifications to present on the user devices by providing users with fine-grained control over the notifications to be presented. These techniques permit the user to associate each of their user devices with a device category. The user further defines time category information that associates each time period of a plurality of time periods with permitted device category information and permitted message category information. The user is able to configure which categories of user devices are permitted to present notifications based on message category and the time period in which the message is received. A technical benefit of this approach is that the messaging platform is able to automatically inhibit the presentation of unnecessary and/or undesirable notifications on specified categories of user devices at specified times. Another technical benefit is that these techniques automatically hide entire conversations temporarily during selected time periods on specified categories of user devices at specified times. Consequently, the user workflow is not interrupted by the presentation of notifications and/or conversations that the user does not wish to see at that time, and user experience is significantly improved. These and other technical benefits of the techniques disclosed herein will be evident from the discussion of the example implementations that follow.

Figure 1:
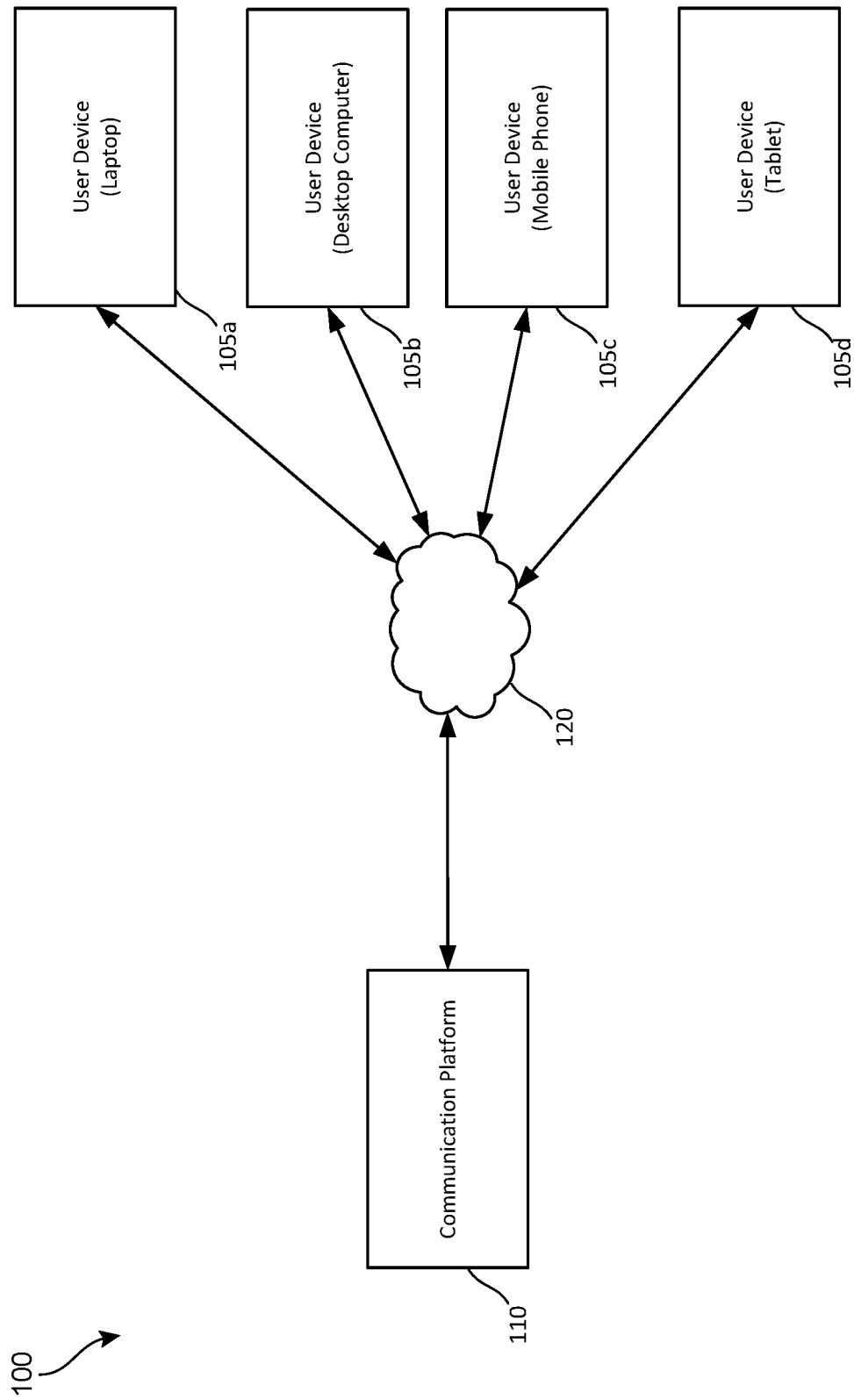
FIG. 1 is a diagram showing an example computing environment in which the techniques disclosed herein for managing the synchronization of files and file information among user devices and a file storage platform may be implemented.

FIG. 1 is a diagram showing an example computing environment 100 in which the techniques disclosed herein for restriction notifications presented to a user may be implemented. The computing environment 100 may include a communication platform 110. The example computing environment 100 may also include user devices 105a, 105b, 105c, and 105d (collectively referred to as user device 105). The user devices 105a, 105b, 105c, and 105d may communicate with the communication platform 110 via the network 120. The network 120 may be a combination of one or more public and/or private networks and may be implemented at least in part by the Internet.

In the example shown in FIG. 1, the user devices 105a-105d are associated with the same user. The user device 105a is a laptop computer that is associated with a device category that indicates that the laptop is primarily used for work. The user device 105b is a desktop computer that is also associated with a device category that indicates that the desktop computer is primary used for work. The user device 105c is a mobile phone that is a hybrid device that is used for both work and personal usage. The user device 105d is a tablet computer that is associated with a personal device category that indicates that the tablet is primarily used for personal usage unrelated to work. The example shown in FIG. 1 includes only four user device 105a-105d and user devices 105 are only associated with three device categories. In other implementations, a user may be associated with a different number of user devices 105 and/or the user devices 105 may be associated with a different number of device categories.

In the example shown in FIG. 1, the communication platform 110 is implemented as a cloud-based service or set of services. The communication platform 110 is configured facilitate communications among users of the communication platform 110. The communication platform 110 supports one or more of email, text messaging, chat messaging, and/or other types of messaging. In some implementations, the communication platform 110 may also provide other services that are accessible to users via their respective user devices 105, such as but not limited to a collaboration platform which enables users to create and share electronic content. The term "electronic document" as used herein can be representative of any document or component in electronic form that can be created by a computing device, stored in a machine-readable storage medium, and/or transferred among computing devices over a network connection or via a machine-readable storage medium. Examples of such electronic documents include but are not limited to word processing documents, presentations, web sites (e.g., Microsoft SharePoint® sites), digital drawings, media files, components thereof, and the like.

The user devices 105a, 105b, 105c, and 105d are each a computing device that may be implemented as a portable electronic device, such as a mobile phone, a tablet computer, a laptop computer, a portable digital assistant device, a portable game console, and/or other such devices. The user devices 105a, 105b, and 105c may also be implemented in computing devices having other form factors, such as a desktop computer, vehicle onboard computing system, a kiosk, a point-of-sale system, a video game console, and/or other types of computing devices. While the example implementation shown in FIG. 1 includes four user devices, other implementations may include a different number of user devices 105 that may utilize the services provided by the communication platform 110. Furthermore, in some implementations, the application functionality provided by the communication platform 110 may be implemented, in part, by a native application installed on the user devices 105a, 105b, 105c, and 105d, and the user devices 105a, 105b, 105c, and 105d may communicate directly with the communication platform 110 over a network connection.

Figure 2A:
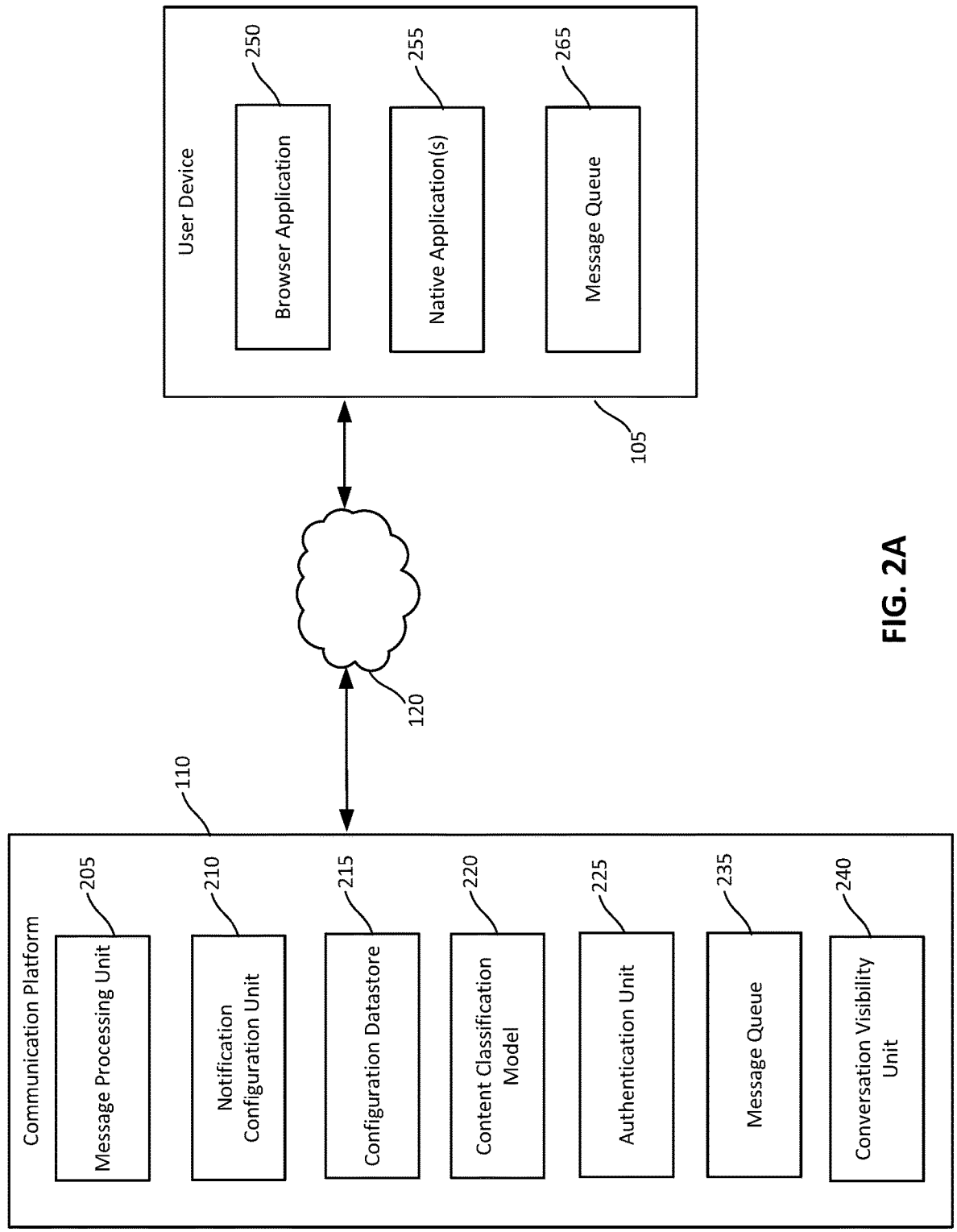
FIGS. 2A and 2B are diagrams showing additional features of the communications platform and the user device shown in FIG. 1.
Figure 2B:
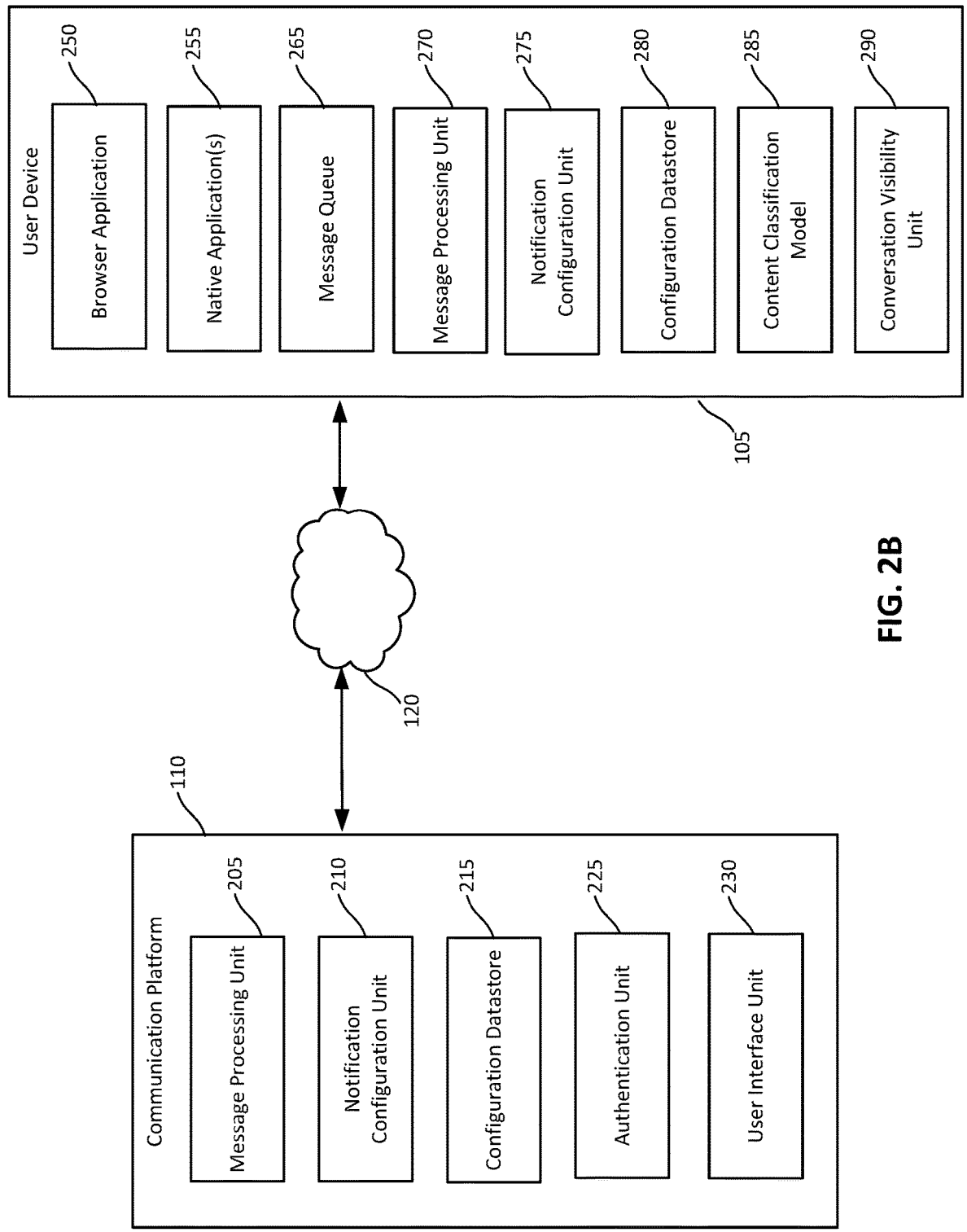

FIGS. 2A and 2B are diagrams showing additional features of the communications platform and the user device 105. In the example implementation shown in FIG. 2A, the communication platform 110 is configured to implement the techniques provided herein for managing which notifications and/or conversations may be presented on the user device 105 in response to receiving a message. In contrast, in the implementation shown in FIG. 2B, the user device 105 is configured to implement the techniques provided herein for managing which notifications and/or conversations may be presented on the user device in response to receiving a message.

FIG. 2A shows additional features of the communication platform 110 and the user device 105. The communication platform 110 includes a message processing unit 205, a notification configuration unit 210, a configuration datastore 215, a content classification model 220, an authentication unit 225, a user interface unit 230, a message queue 235, and a conversation visibility unit 240.

The message processing unit 205 receives messages for a user of the user device 105. The messages may be received from a user device of another user (not shown). The message processing unit 205 is configured to determine the intended recipient of the message based on a phone number, email address, user alias, or other identifier associated with the intended recipient of the message. The message processing unit 205 is configured obtain user device information for the intended recipient from the configuration datastore 215. As discussed in the preceding examples, the user may be associated with multiple user devices, and the user may receive messages on all or a subset of these user devices. The messages may also be associated with a conversation, which refers to a group of related messages in a message thread. The user device information also includes information associating each user device with a device category. The user associated with the devices may assign a device category from among a set of predefined device categories to each device. In other implementations, the communication platform 110 provides a user interface that enables the user to define additional categories of user devices. The message processing unit 205 also accesses time category information from the configuration datastore 215. The time category information associates each time period of a plurality of time periods with permitted device category information and permitted message category information. The permitted device category information indicates which categories of user devices are permitted to provide notification of receive messages during a specified time period, and the message category information indicates which categories of messages from a plurality of message categories for which the notifications may be generated during the time period. The message processing unit 205 determines a message category for the messages received and determines whether the message may be delivered to each of the user devices based on the user device information retrieved from the configuration datastore 215. In some implementations, the message processing unit 205 determines the message category based on user input. In other implementations, the message processing unit 205 uses the content classification model 220 to analyze the message to obtain a prediction of the message category. The message processing unit 205 sends the message to each of user devices for which notifications are permitted during the time category in which the message is received. The message processing unit 205 delays the delivery of the message to the other user devices until a time period is reached in which the message may be delivered to these other devices.

In some implementations, the message processing unit 205 inserts the delayed messages into the message queue 235 which is a data structure used to store information indicating which messages have not yet been delivered and the user devices to which the message has not yet been delivered. In some implementations, the message queue 235 may be implemented as separate queues for each type of message that may be processed by the communication platform 110. In a non-limiting example, email messages are inserted into a first queue, text messages are inserted into a second queue, chat messages are inserted into a third queue, and so forth for each type of message which the communication platform 110 is configured to process. The message processing unit 205 is configured to periodically check the message queue 235 to determine whether the pending messages may be delivered based on the message category information and the time category information.

The notification configuration unit 210 provides a web application that can be accessed by a browser application or browser-enabled native application implemented on the user devices 105a-105d in some implementations. The web application provides a user interface that enables the user to associate user devices with the user. The web application also provides a user interface that enables the user to define time category information for the user and to associate permitted device category information and permitted message category information with the time category information. These categories are applied to notifications associated with individual messages and/or entire conversations in some implementations. The notification configuration unit 210 stores the configuration information obtained from the user in the configuration datastore 215. In some implementations, the configuration datastore 215 updates the data structures shown in FIGS. 5A-5D with the information obtained from the user.

The configuration datastore 215 is a persistent datastore that stores configuration used by the communication platform 110. Each user may be associated with custom device category information and time category information that suits the needs of the user. Users may have different combinations of user devices and different usage habits which may be satisfied by the permitted the user to customize which notifications may be presented on which devices during specific time periods.

The content classification model 220 may be implemented using various machine learning architectures such as deep neural networks (DNNs), recurrent neural networks (RNNs), convolutional neural networks (CNNs), and/or other types of neural networks. The content classification model 220 is trained to receive a textual message as an input and to output a prediction of the message category. The input may be various types of messages, including but not limited to an email, text message, or chat message. The content classification model 220 is trained to predict the message category from among a set of predetermined message categories on which the model has been trained. Examples of such message categories include but are not limited to work related messages, urgent work-related messages, personal messages, and urgent personal messages. In some implementations, a default message category may also be provided, and the default message category may be initially assigned to a message and/or conversation until a message category is determined for that message or conversation. Furthermore, once a message category has been assigned to a message in a conversation, subsequent messages in the thread may be assigned the same message category without each message in the thread being analyzed by the content classification model 220 to obtain a message category. In other implementations, each message in a conversation is analyzed by the content classification model 220 to ensure that the message category has not changed. In a non-limiting example, a first message in a conversation is categorized as being a personal message and the second message in the conversation is categorized as being a work-related message. This change in message category can cause the communication platform 110 to handle the notifications associated with these two messages differently. In a non-limiting example, the change in message category from personal to work-related causes the communication platform 110 to permit notifications associated with the message thread to be presented to the user during work hours and/or display the conversation to the user in the browser application 250 and/or the one or more native applications 255. Prior to the conversation being reclassified from personal to work-related, the communication platform 110 would have either delayed the notifications associated with messages associated with the conversion during work hours and/or provided silent notifications for messages associated with the conversation during work hours. Furthermore, the communication platform 110 would have hidden the conversation in the browser application 250 and/or the one or more native applications 255 during work hours in some implementations to avoid distracting the user with personal messages during work hours.

In some implementations, the performance of the content classification model 220 is fine-tuned in some implementations based on feedback received from the user indicating whether the communication platform 110 correctly classified messages. The notification configuration unit 210 provides a user interface that permits the user to provide this feedback in some implementations. Fine-tuning the content classification model 220 can lead to the model providing better predictions of the message category in the future.

The authentication unit 225 provides functionality for verifying whether users are permitted to access the services provided by the communication platform 110. In some implementations, the authentication unit 225 provides functionality for receiving authentication credentials for the users from their respective user devices 105. The authentication unit 225 may be configured to verify that the authentication credentials are valid and permit the users to access the services provided by the communication platform 110 responsive to the authentication credentials being valid.

The communication platform 110 includes a conversation visibility unit 240 in some implementations. In such implementations, the communication platform 110 is configured to cause conversations associated with certain categories of messages to be selectively presented or hidden on the user device 105 based on the message category associated with the conversation, the time category information associated with the user, and user device category information. The selective presentation and/or hiding of conversations can be implemented in addition to or instead of the selective delaying of notifications and/or presentation of silent notifications. Furthermore, in some implementations, the selective presentation and/or hiding of conversations may be performed on certain categories of user devices while the selective delaying of notifications and/or presentation of silent notifications is performed on other categories of user devices.

In some implementations, the user accesses message content via one or more native applications 255 on each user device 105. In such implementations, the communication platform 110 is configured to maintain information indicating which conversations are associated with the user of the user device 105 and the message category associated with each of the conversations. The message category associated with each conversation is reevaluated and updated each time a message associated with the conversation is received in some implementations. The conversation visibility unit 240 is scheduled to periodically determine whether the conversations associated with the user may be presented on each category of user device associated with the user in some implementations. In some implementations, the determinations is be performed by the conversation visibility unit 240 at the start of the time period associated with each time category to determine whether each conversation should be presented to the user or hidden from the user on each category of user device and upon receipt of a message associated with each conversation.

The communication platform 110 sends a signal to the one or more native applications 255 to selectively present or hide conversations. Examples of selectively hiding conversations are shown in FIGS. 4G-4K, which are discussed in detail in the examples which follow. In other implementations, such as that shown in FIG. 2B, the user device 105 determines whether to display each conversation based on the device category of that client device 205, the time category information, and the message category associated with each conversation.

In some implementations, the communication platform 110 implements a web application in some implementations that provides access to the various services of the communication platform 110. The message processing unit 205 provides a web application to create, receive, and reply to messages. The notification configuration unit 210 provides a web application configuring various parameters used to control the types of notifications that may be presented on the user devices 105. In some implementations, the conversation visibility unit 240 sends a signal to the one or more native applications 255 to selectively present or hide conversations based on the message category, the time category information, and the device category information.

The user device 105 may include one or more native applications 255 and/or a browser application 250. In some implementations, the one or more native applications 255 includes a native application configured to communicate with the communication platform. The communication platform 110 provides a web application in some implementations that provides access to the various services of the communication platform 110. In some implementations, the one or more native applications 255 includes a native application configured to communicate with the communication platform 110. In such implementations, the native application implements a user interface for sending and receiving messages and for configuring the various parameters used to control the notifications which may be presented on the user devices 105.

The browser application 250 is an application for accessing and viewing web-based content, which may be provided by the communication platform 110. In some implementations, the notification configuration unit 210 of the communication platform 110 provides a web application that enables the user to utilize the services of the communication platform 110 in a similar manner as the native application described above.

The communication platform 110 may support both the one or more web-enabled native applications 255 and one or more web applications, and the users may choose which approach best suits their needs. The communication platform 110 may also provide support for the one or more native applications 255, the browser application 250, or both to provide functionality for a user of the user device 105 to obtain the services provided by the communication platform 110.

In some implementations, the user device 105 includes a message queue 265. In such implementations, the message processing unit 205 sends messages to the user device 105 that would have otherwise been stored in the message queue 235 of the communication platform 110 with an indication that the message should be stored in the message queue 265 until a time period in which a notification may be presented on the user device 105. In some implementations, the indication may include time period information that indicates when the user device 105 may remove the delayed messages from the message queue 265 for processing by a native application 255 and a notification of the message presented on the user device 105. In other implementations, the message processing unit 205 sends an indication to the user device 105 that a message may be moved from the message queue 265 for processing by a native application 255 and a notification of the message presented on the user device 105.

In the implementation shown in FIG. 2B, the user device 105 rather than the communication platform 110 is configured to manage which notifications are presented on the user device 105. The user device 105 includes a message processing unit 270, a notification configuration unit 275, a configuration datastore 280, and a content classification model 285. In such implementations, the message processing unit 205 sends messages received for a user to each of the user devices 105 associated with the user. The message processing unit 205 is configured obtain user device information for the intended recipient from the configuration datastore 215 and device information for the user devices 105 of the intended recipient. The message processing unit 205 then sends the message to each of the user device 105 for processing by the message processing unit 270 implemented on the user device 105. The message processing unit 270 obtains user device information and time category from the configuration datastore 280. The user device information and the time category information is provided by the user using the native application 255 in some implementations, and the native application 255 updates the configuration datastore 280 on the user device 105 with this information. The user device 105 propagates this information the communication platform 110 in some implementations to update the configuration datastore 215 maintained by the communication platform 110. The updates to this information may also be propagated by the communication platform 110 to each of the user devices 105 associated with the user so that the user does not have to manually configure the settings of each user device 105 individually.

The message processing unit 270 analyzing messages received from the communication platform 110 and determines a category for the messages. The message processing unit 270 determines a message category for the messages received and determines whether a notification of the message may be presented on the user device 105 based on the user device information and time category information retrieved from the configuration datastore 215. In some implementations, the message processing unit 270 determines the message category based on user input. In other implementations, the message processing unit 270 utilizes the content classification model 285 to classify messages. The content clarification model 285 is similar to the content classification model 220 shown in the FIG. 2A. The message processing unit 270 places messages for which notifications must be delayed into the message queue 265 in some implementations. The message processing unit 270 periodically checks the messages in the message queue 265 to determine whether these messages can be removed from the queue and a notification presented to the user. In yet other implementations, the message processing unit 270 is configured to provide incoming messages to the native application 255 for processing rather than placing the message in the message queue 265 and the message processing unit 270 generates a silent notification on the user device 105. The silent notifications provides no haptic or audible indication on the user device 105. The silent notification may include a graphical element that is unobtrusive on a display of the user device, such as a small icon or other indicator that a message has been received. Such a graphical indication does not obstruct any content or applications windows that are open on the user device, which could interrupt the user workflow.

The client device 205 includes a conversation visibility unit 290 in some implementations. In such implementations, the conversation visibility unit 290 is configured to cause conversations associated with certain categories of messages presented by the one or more native applications 255 to be selectively presented or hidden based on the message category associated with the conversation, the time category information associated with the user, and device category information.

FIGS. 3A-3D show examples of interactions between the user devices 105*a*-105*d* and the communication platform 110 shown in the preceding figures. The user devices 105a and 105b are a laptop and desktop computer, respectively, which are associated with the work-related device category. The user device 105c is a mobile phone associated with a hybrid device category, which indicates that the user device 105c may be used for both work-related and personal tasks. The user device 105d is a tablet computer that is associated with a personal device category, which indicates that the user device 105d is used for personal tasks unrelated to work. These example device categories are intended to demonstrate the concepts herein do not limit these techniques to those specific device categories or combination of device categories.

Figure 3A:
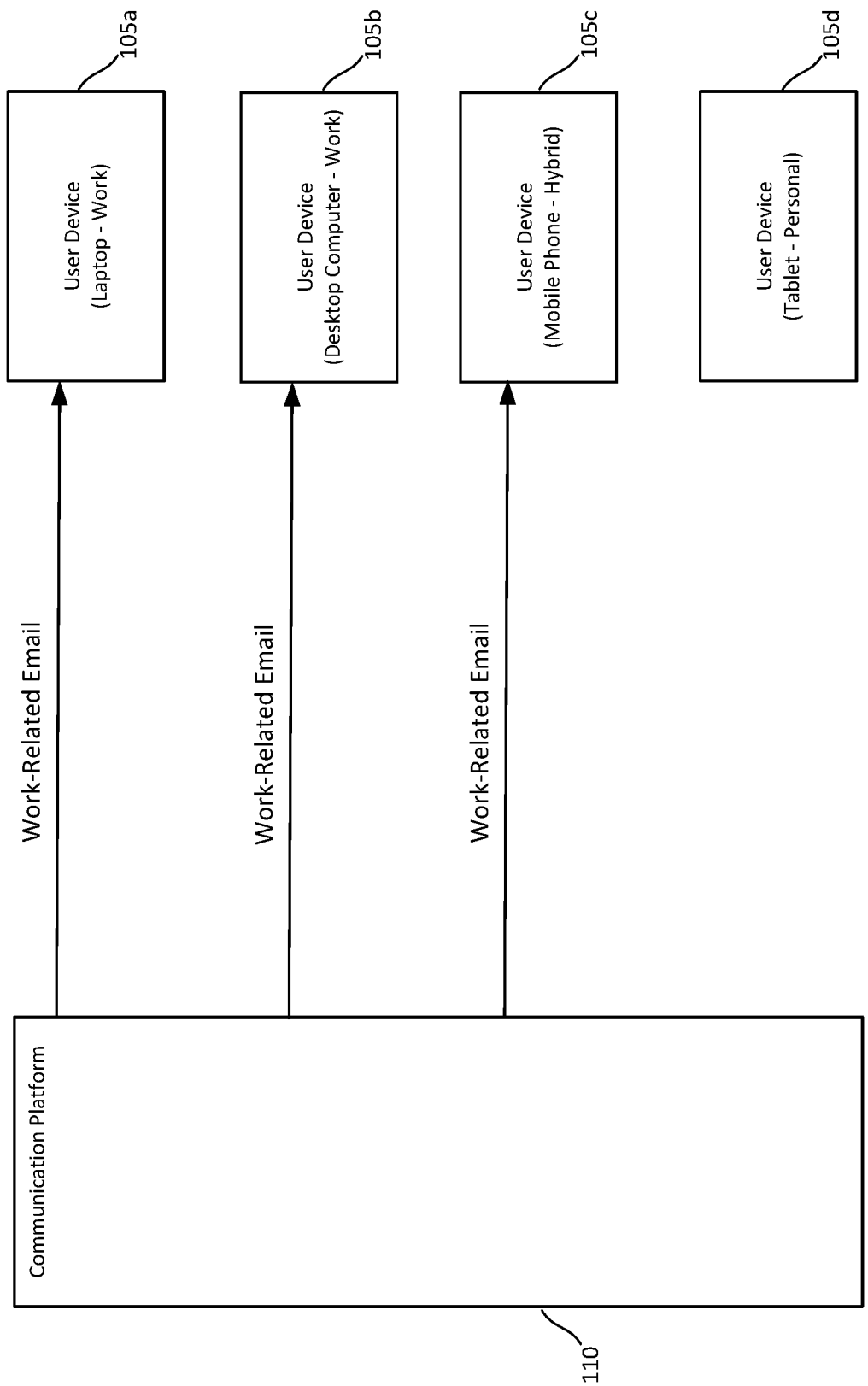
FIGS. 3A-3D show examples of interactions between the user devices and the communications platform shown in the preceding figures.

In the example implementation shown in FIG. 3A, a work-related email message is received at the communication platform 110. The communication platform 110 determines that the intended recipient of the email message is associated with the user devices 105a-105d in this example implementation. The communication platform 110 accesses the user device information to determine the category of each of the user devices 105a-105d. The communication platform 110 also determines the message category associated with the work-related email message. The communication platform 110 then utilizes the time category information including the determine permitted device category information and the permitted message category information to determine which categories of devices are permitted to the display a notification that the email message has been received. In this example, the work-related email message is permitted to be the devices in the work-related device category and the hybrid device category for the time period in which the work-related email is received. The communication platform 110 sends the email to the user devices 105a, 105b, and 105c, and the user devices 105a, 105b, and 105c present a notification that the work-related email has been received. The communication platform 110 does not send the work-related email to the user device 105d, which is a personal user device, and the user has not authorized notifications of messages of the work-related message category be presented to the user on the user device 105d.

Figure 3B:
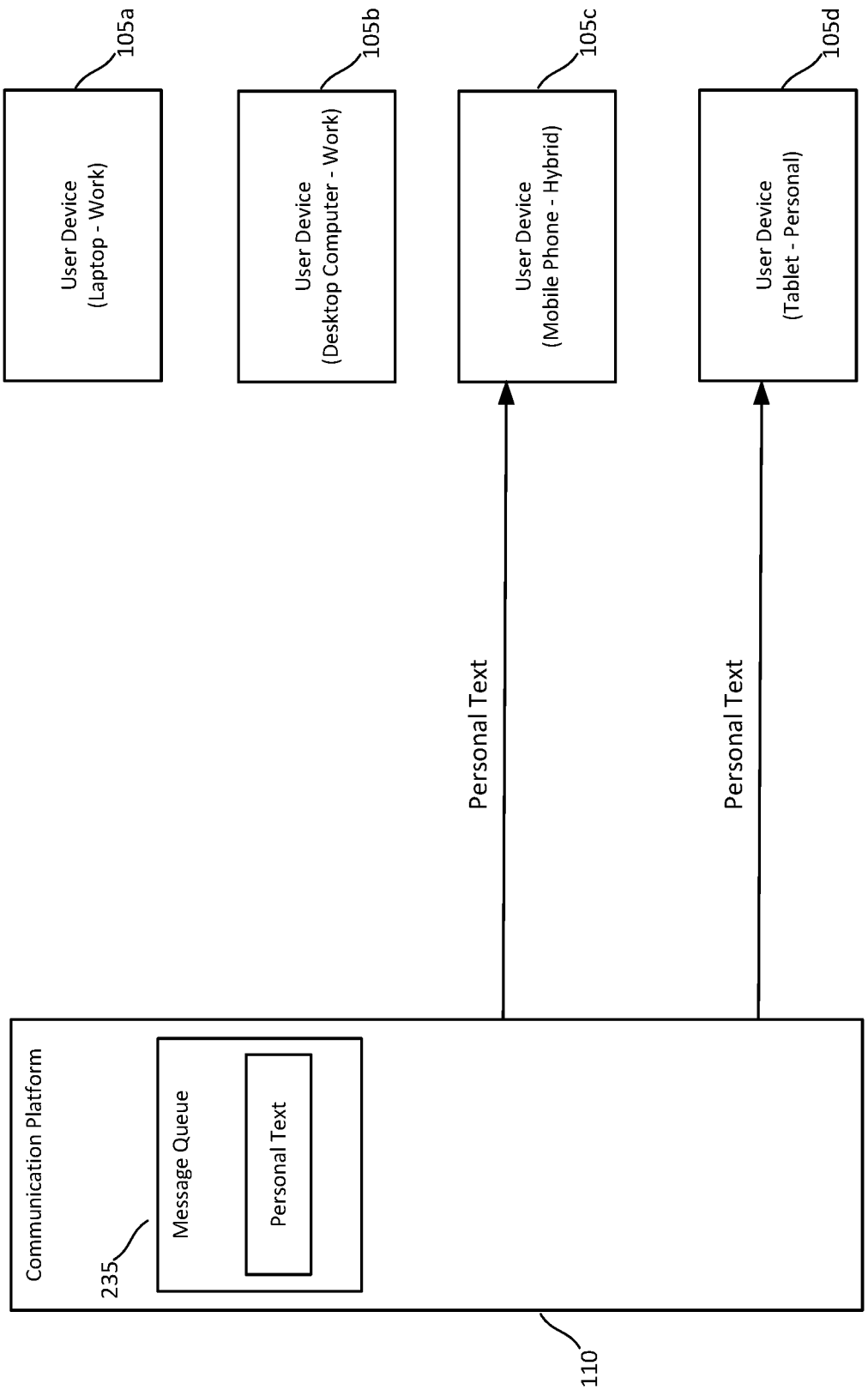

In the example implementation shown in FIG. 3B, a personal text message is received at the communication platform 110. In this example implementation, a notification that the personal text has been received may be presented on all user devices 105a-105d. However, the communication platform 110 determines that a notification of the personal text message cannot be presented on the user devices 105a and 105b, which are both user devices that fall into the work-related device category. The user in this implementation has defined time category information that precludes the presentation of notifications of the personal message category during work hours. Consequently, the communication platform 110 inserts a copy of the personal text into the message queue 235 on the personal device. The communication platform 110 periodically checks whether the messages in the message queue can be sent to the user devices 105a and 105b. In this example implementation, the user has defined time category information which indicates that notifications for messages of any type which fall into the personal message category may be presented on the work-related user devices 105a and 105b after work hours. The user has defined time category information that indicates that personal messages may be sent to devices in the hybrid device category and the personal device category at any time. Therefore, the communication platform 110 sends the personal text message to the user devices 105c and 105d upon receipt of the personal text message by the communication platform 110. The personal text message is forward to the user devices 105c and 105d, and the mobile devices 105c and 105d present a graphical, auditory, or haptic notification of the personal text message.

Figure 3C:
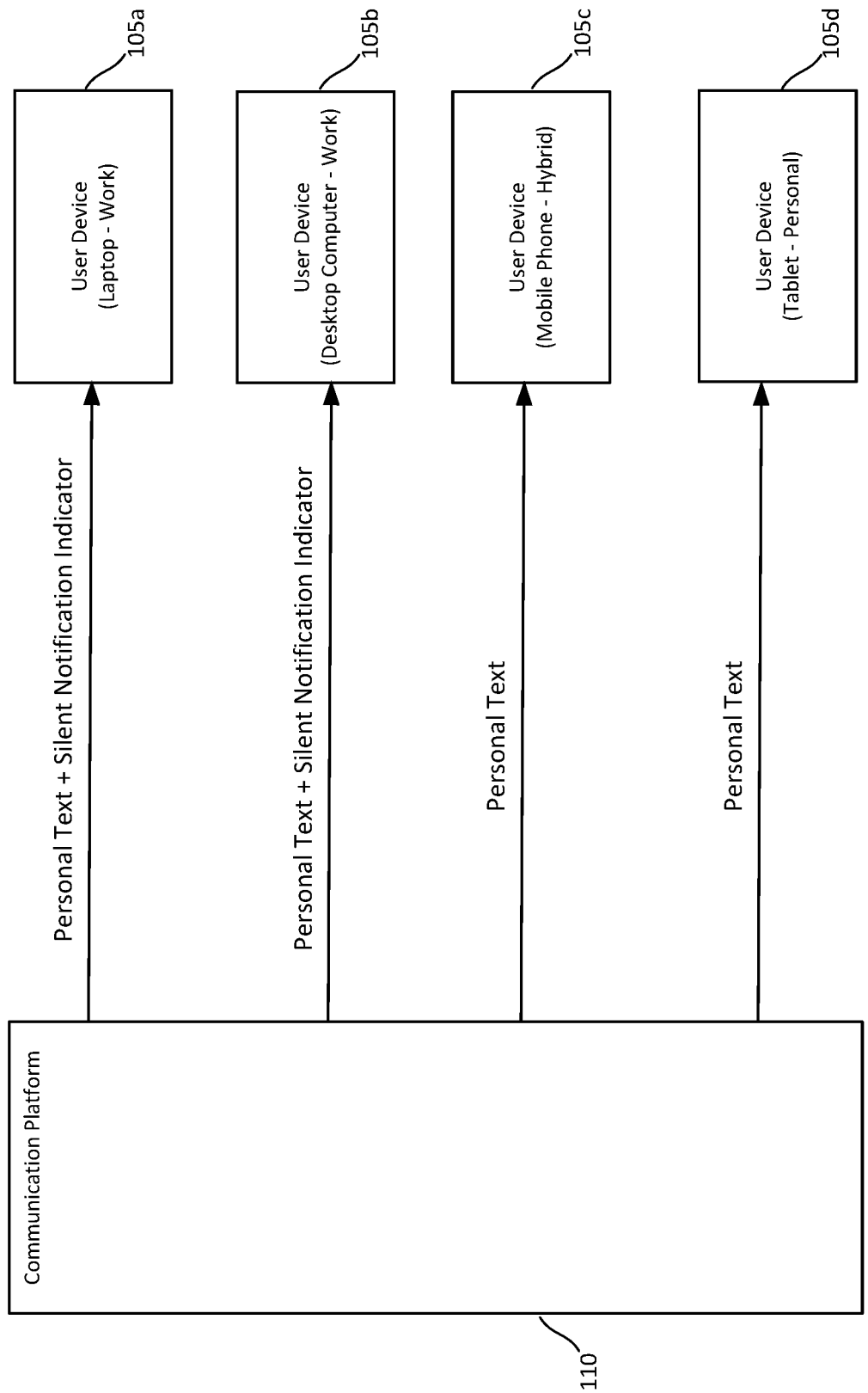

FIG. 3C is a diagram showing another implementation similar to that shown in FIG. 3B in which a personal text message is received at the communication platform 110. In this implementation, the communication platform 110 does not hold the personal text message in a message queue on the communication platform 110. Instead, each of the user devices 105a-105d are configured to manage the notifications presented on that user device. The communication platform 110 sends the personal text message the user devices 105a-105d. In some implementations, the communication platform 110 may include a silent notification indicator with the personal text message send to the user devices 105a and 105b, which indicates that the user devices 105a and 105b should not present a haptic or audible notification to the user. However, the user devices 105a and 105b may present an unobtrusive graphical notification on a display of the user device. As will be discussed in greater detail in the examples which follow, silent notifications may also be used for implementation in which conversations are hidden.

Figure 3D:
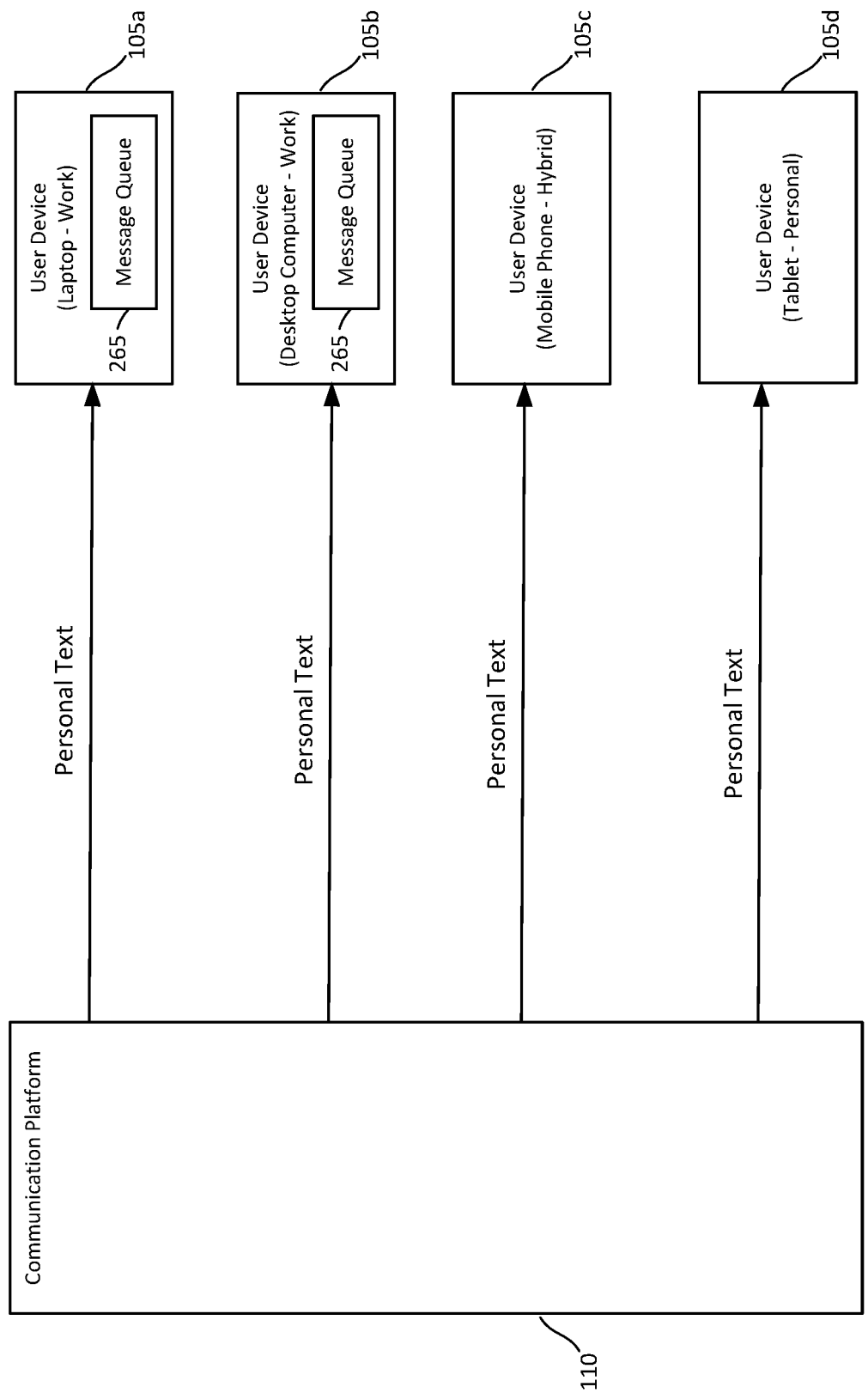

FIG. 3D is a diagram showing another implementation similar to that shown in FIGS. 3B and 3C. The communication platform 110 does not hold the personal text message in a message queue on the communication platform 110, and the user devices 105a-105d are responsible for managing the notifications presented on these devices. The user devices 105a and 105b store the personal text message in the message queue 265 implemented on each user device, and the personal text message remains in the message queue 265 until a time period is reached in which a user device of the work-related device category is permitted to present a notification of the personal message category.

Figure 4A:
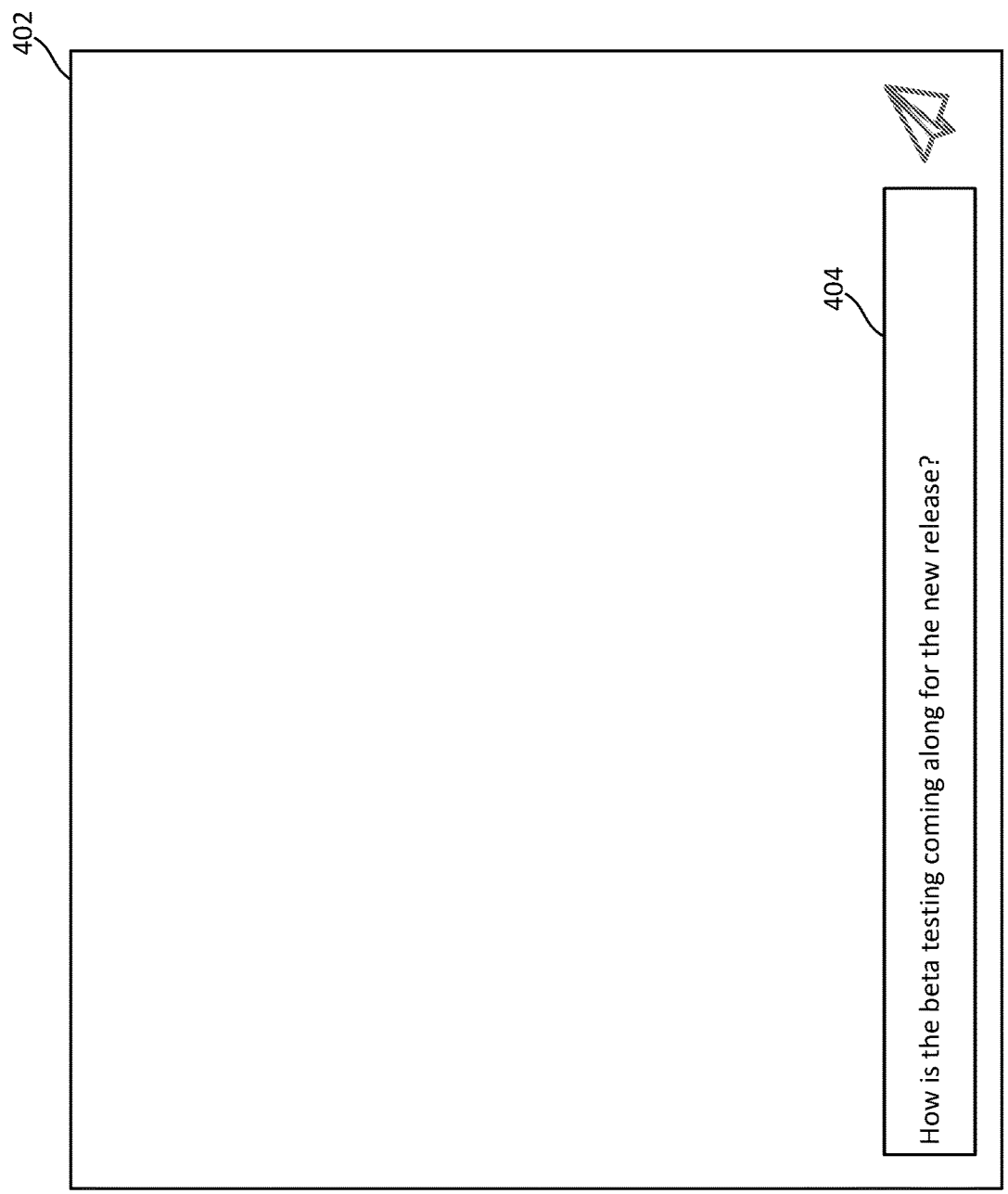
Figure 4B:
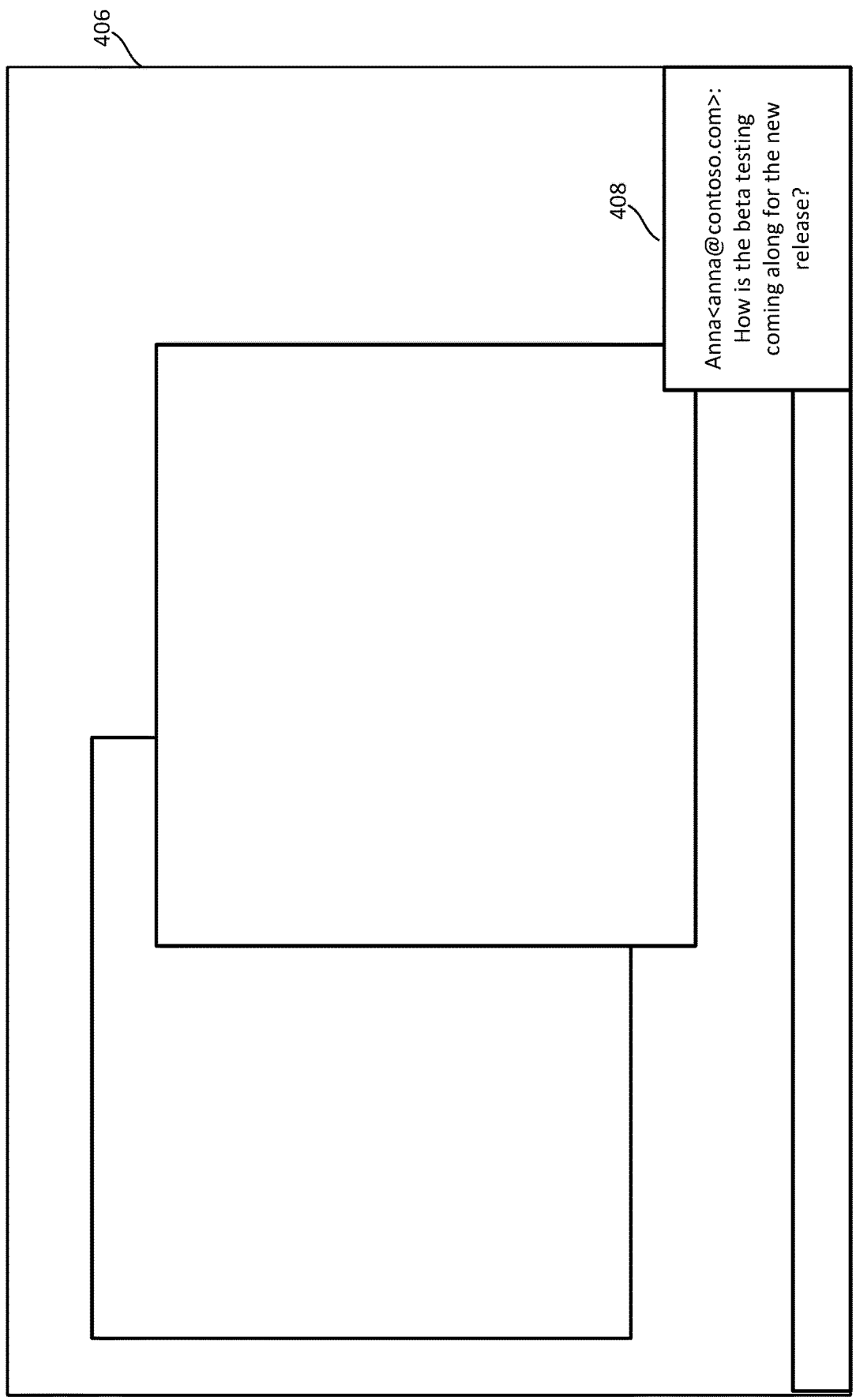

FIGS. 4A-4F are diagrams of an example user interfaces showing example of notifications being in the preceding figures. FIG. 4A is an example of a user interface 402 of a text messaging application in which a first user, a project manager, drafts a text message 404 to a second user requesting an update on a project. The message is sent to the communication platform 110, which determines whether notifications of the receipt of the message should be presented on the user devices 105 of the second user. FIG. 4B shows an example user interface 406 representing a desktop of the laptop computer of the second user. The laptop computer is associated with the work-related device category, and the message is classified as being associated with the work-related message category. In this example, the communication platform 110 determines that the notification should be presented on the laptop of the second user, and the notification 408 is displayed on the user interface 406.

Figure 4C:
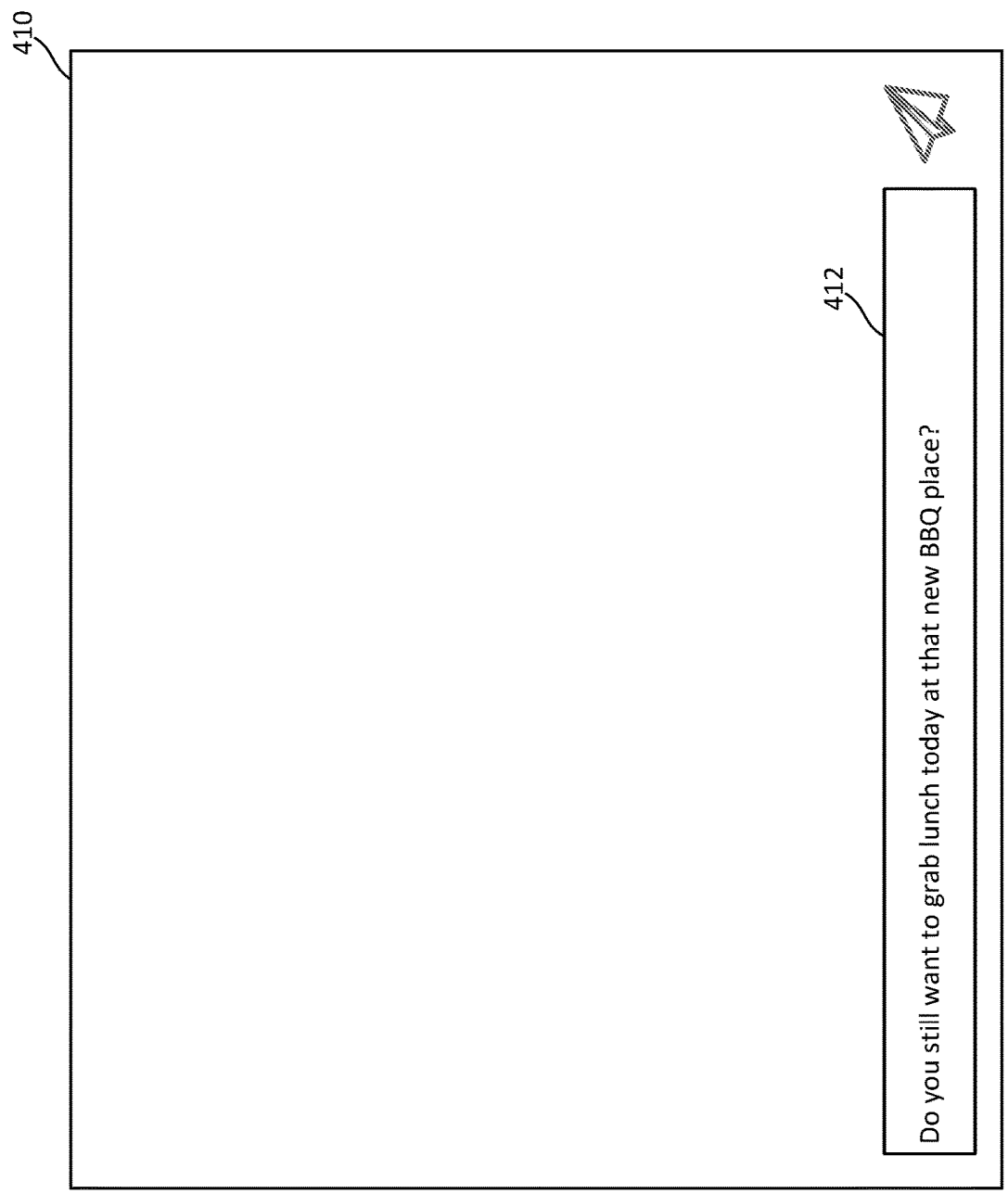
Figure 4D:
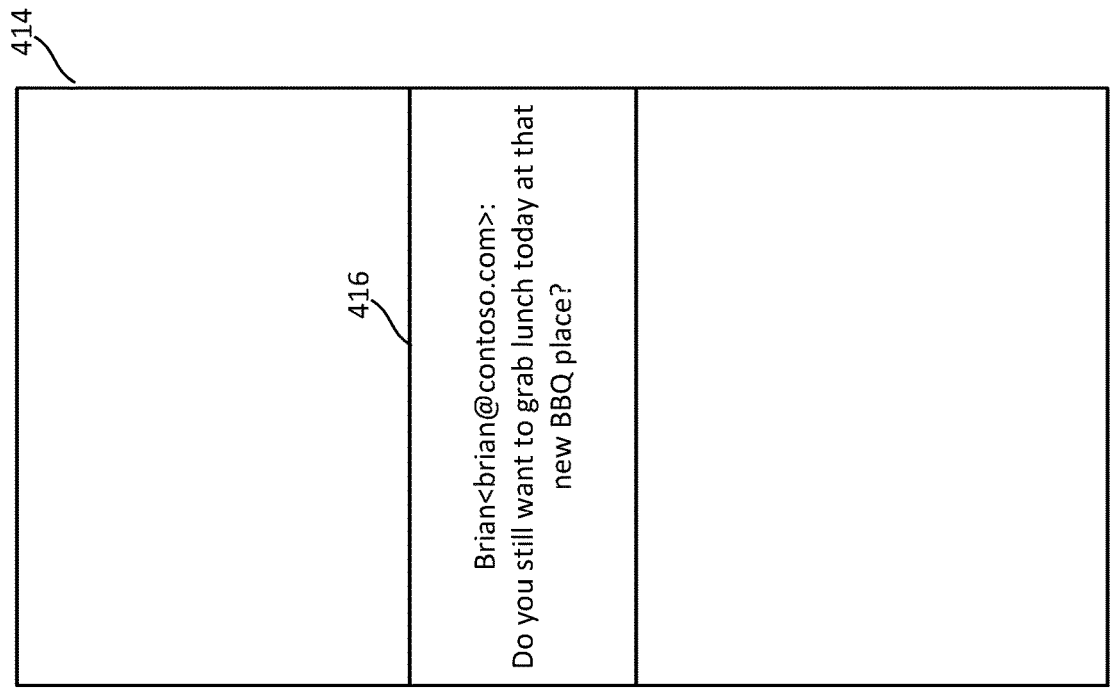
Figure 4F:
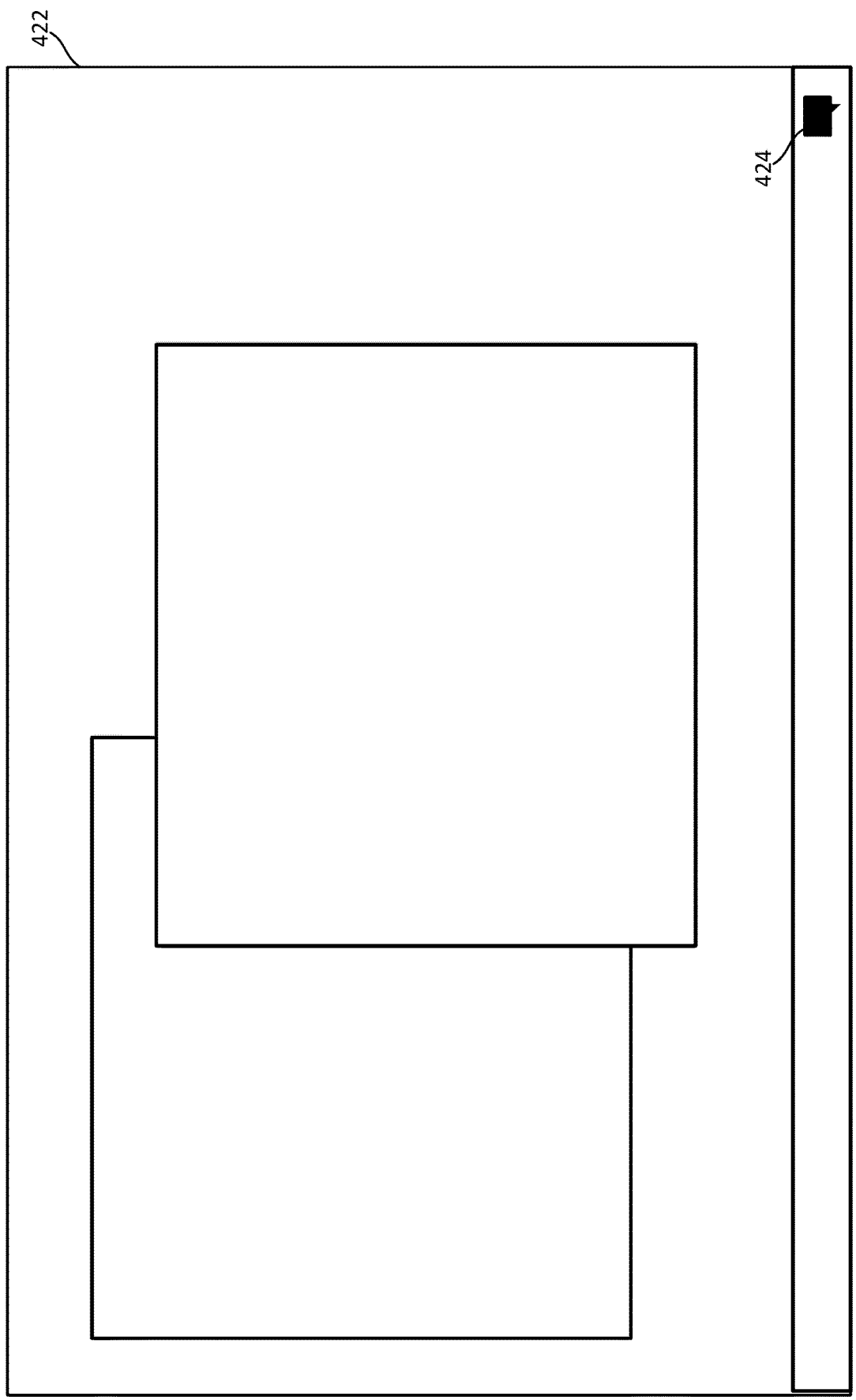

FIG. 4C is an example of a user interface 410 of a text messaging application in which a first user drafts a text message 412 to a second user to asking if the second user would still like to meet for lunch. As in the preceding examples, the message 412 is received by the communication platform 110, and the communication platform 110 determines whether the user devices 105 associated with the second user may display a notification that the message 412 has been received. FIG. 4D shows an example of a user interface 414 of a mobile phone of the second user. The mobile phone is associated with the personal device category, and the communication platform 110 classifies the message as a personal message. The communication platform 110 determines that the notification 416 should be presented on the user interface 414 of the mobile phone. Suppose, however, that the second user has a second mobile phone that is primarily used for work and is classified in the work-related device category. The communication platform 110 determines based on the time category information associated with the user that notifications for messages that are not classified as the work-related message category should not be displayed on the second mobile device during work hours. In the implementation shown in FIG. 4D, no audible or haptic notification is presented to the user. Only a non-obtrusive graphical notification 420 is presented on user interface 418 of the second mobile phone. FIG. 4E shows another example of a user interface 422 representing a laptop computer associated with the second user that is classified in the work-related device category. A non-obtrusive graphical notification 424 is presented on user interface 422 of the laptop. The notifications 420 and 424 represent examples of silent notifications that may be presented on a user device. Other types of silent notifications can be used in other implementations.

FIGS. 4G-4K are diagrams of an example user interfaces 430 of a messaging application that show how conversations may be classified and selectively presented or hidden on a native application 255 or the browser application on a client device 205. The conversations are selectively presented or hidden based on the device category associated with the client device 205, the time category information, and the message category associated with the conversations.

Figure 4G:
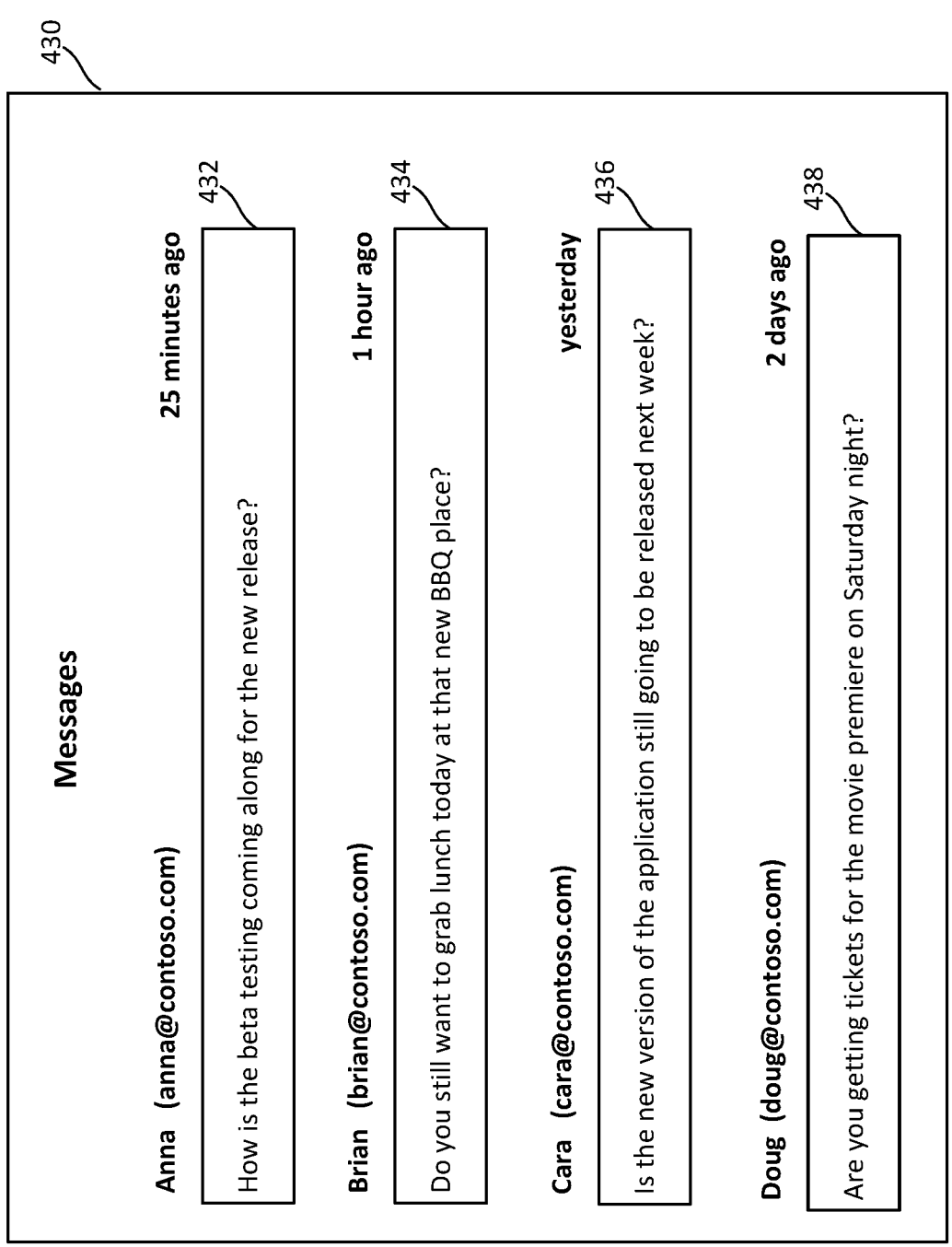
FIGS. 4G-4K are diagrams of an example user interfaces showing examples of conversations being selectively presented or hidden according to the techniques disclosed herein.

In FIG. 4G, the message interface 430 shows four conversations 432, 434, 436, and 438. In some implementations, such as the example implementation shown in FIG. 2A, the communication platform 110 is configured to categorize each of the conversations and causes the conversations to be selectively presented or hidden. In other implementations, such as the example implementation shown in FIG. 2B, the user device 105 is configured to categorize each of the conversations and to cause the conversations to be selectively presented or hidden. In this example, the conversations 432 and 436 are worked-related conversations, and the conversations 434 and 438 are personal conversations that are non-work related.

Figure 4H:
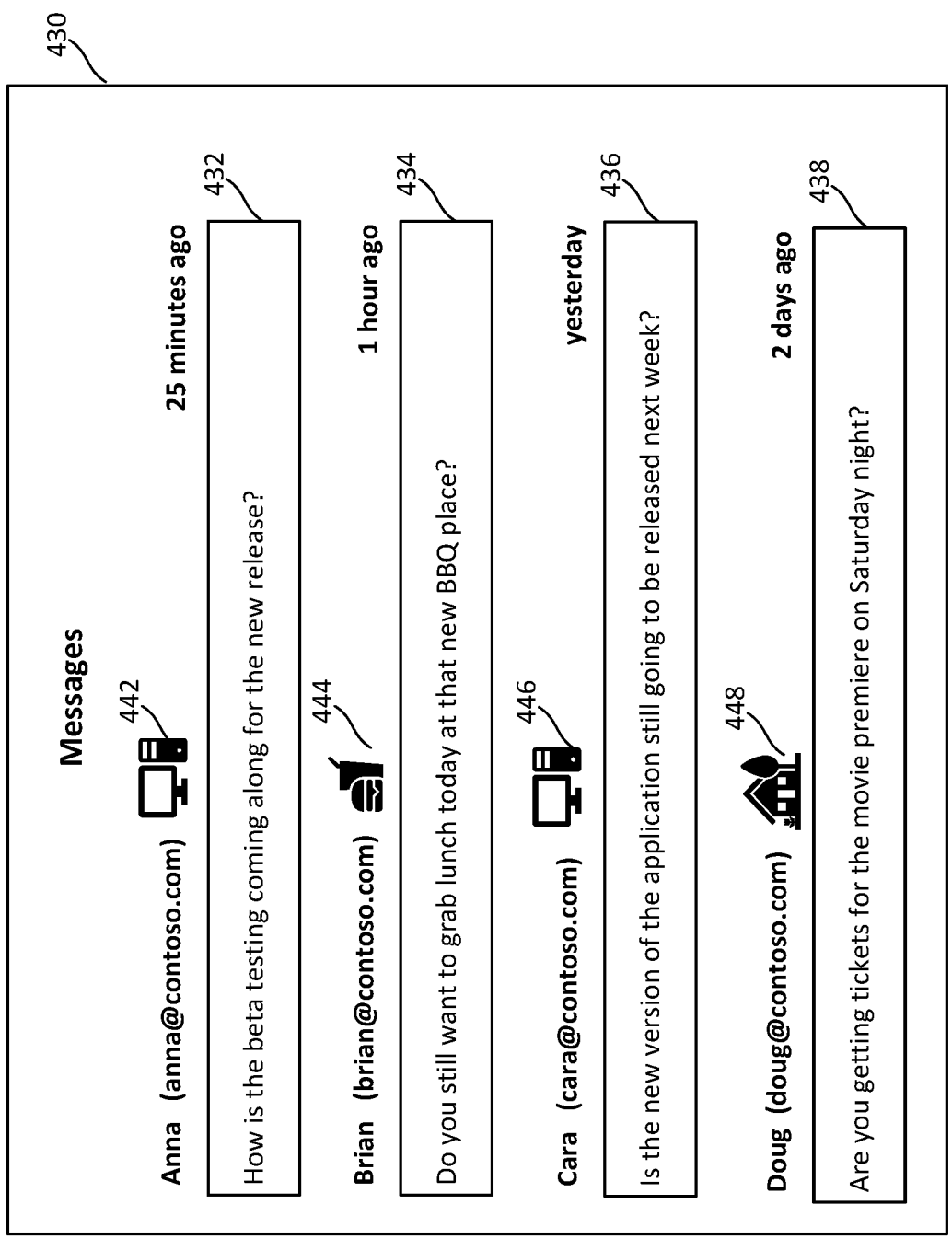
Figure 4I:
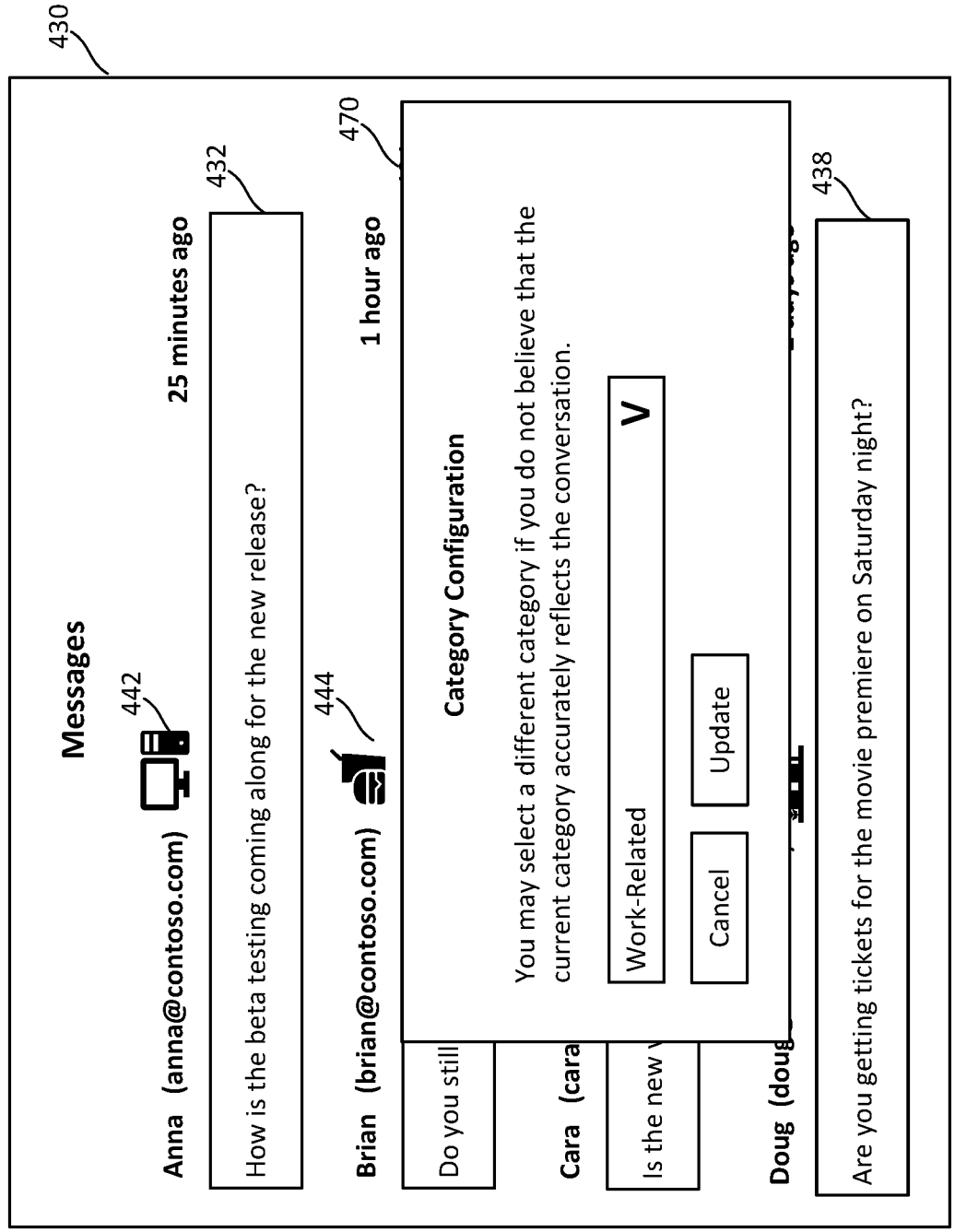

FIG. 4H shows an example of these conversations having been categories and a category indicator 442, 444, 446, and 448 being presented next to each of the conversations. In some implementations, such indicators may be presented next to each of the conversations to inform the user of the category that has been associated with the conversation. In some implementations, the user may click on or otherwise actuate the category indicator to cause a conversation category configuration pane 470 to be displayed as shown in FIG. 4I. The conversation category configuration pane 470 includes a dropdown that the user may select a category from among the categories of message categories that may be associated with the conversation. The communication platform 110 and/or the client device 105 updates the category associated with the message in response to the user changing the category. In some implementations, the models used to categorize the messages may be provided feedback to improve their predictions in response to the user changing a message category that was automatically assigned to a conversation by the communication platform 110 or the client device 105.

Figure 4J:
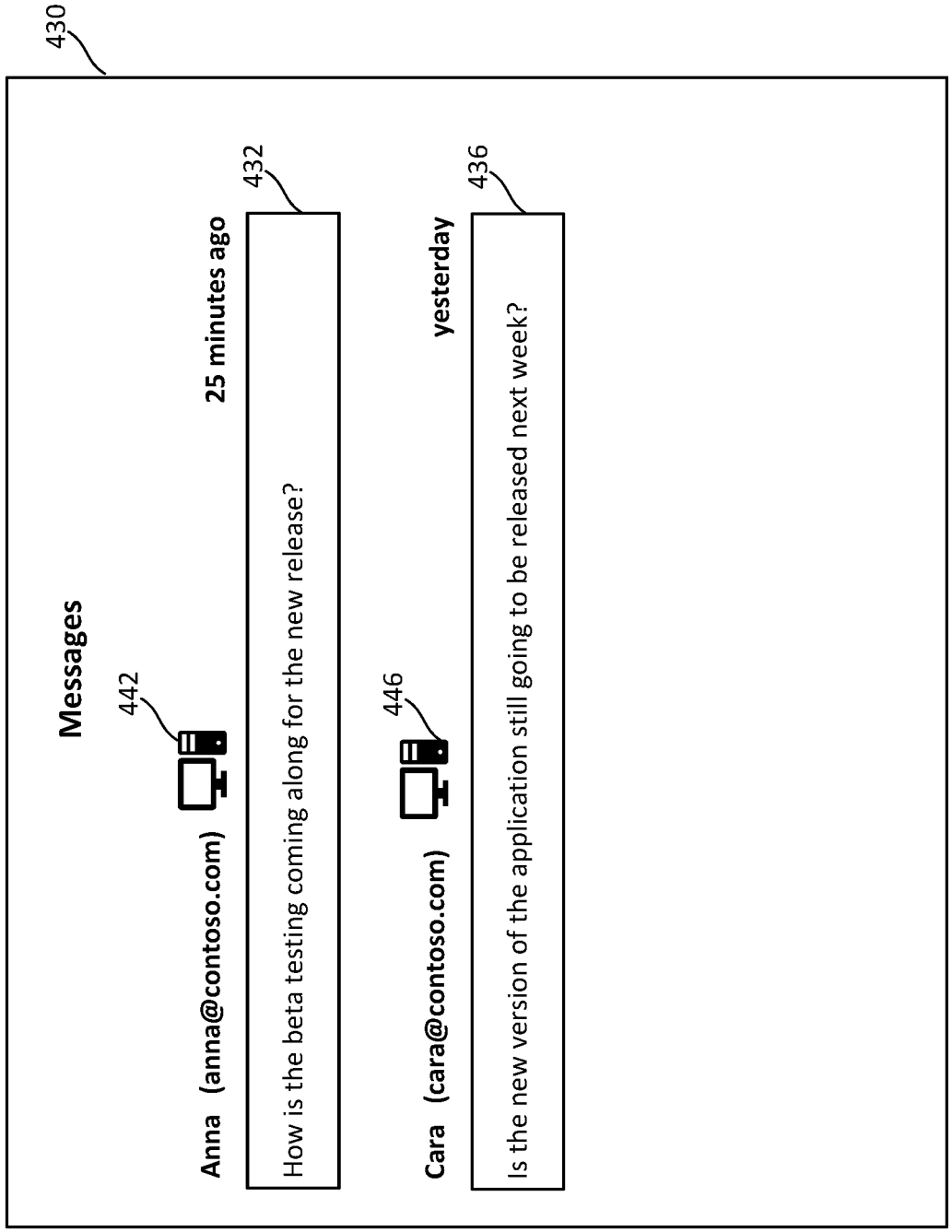
Figure 4K:
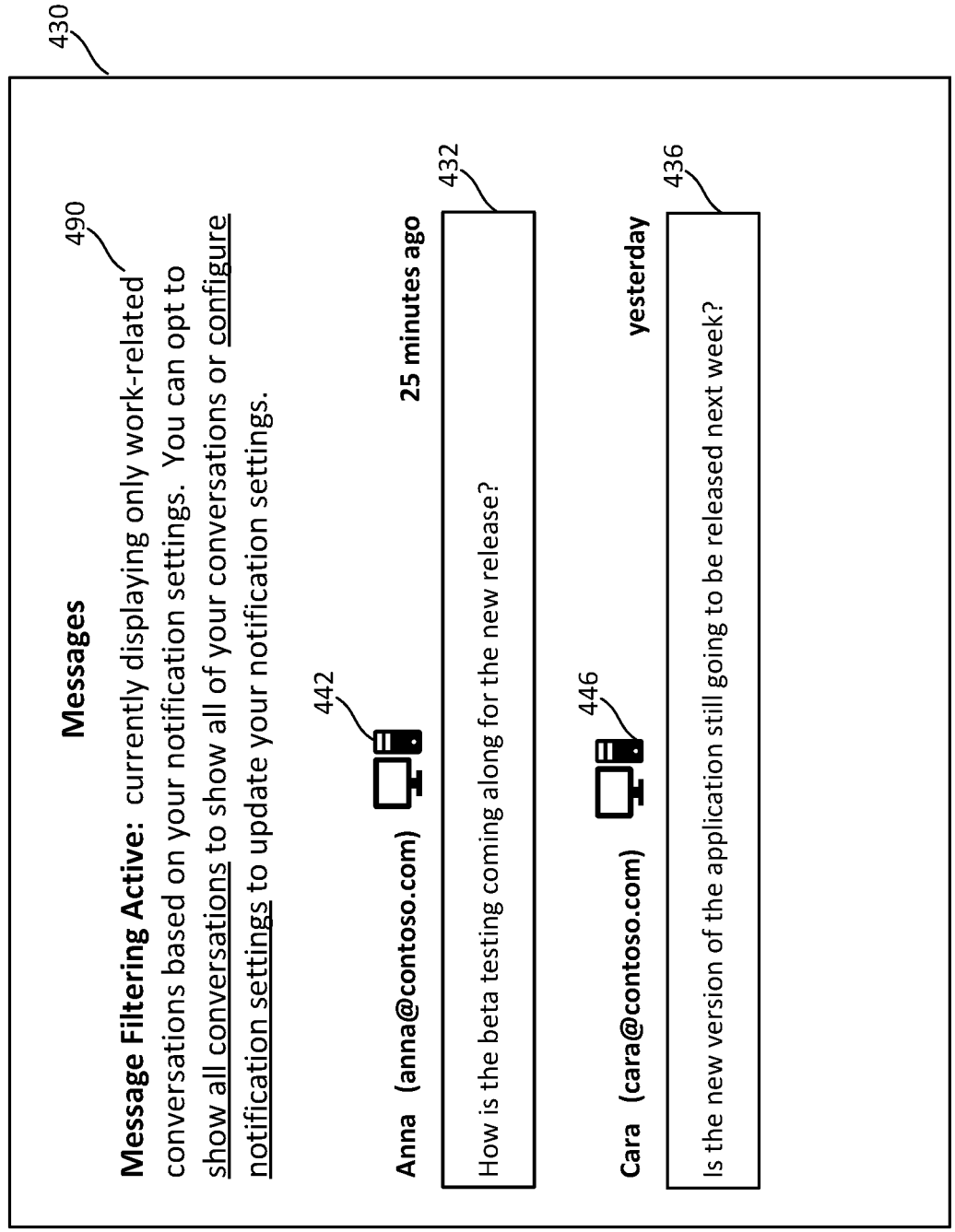

FIG. 4J show an example of the user interface 430 shown during the user's work hours on a work-related device, such as the user devices 105a and 105b and/or hybrid user device 105c which is used for both work-related and personal tasks. In the example shown in FIG. 4J, the communication platform 110 or the client device 105 has presented the work-related conversations 432 and 436 and hidden the personal conversations 434 and 438 based on the user device information, the category information, and message category information as discussed in the preceding examples. FIG. 4K shows another example of the user interface 430 in which the work-related conversations are presented, and the other conversations have been hidden. The user interface 430 includes a message 490 that indicates that filtering is active and provides the user with links to show all conversations and/or configure the notification settings used to determine which messages notifications and/or conversations should be presented to the user on each client device 105 for each message category and time category.

FIGS. 5A-5D are diagrams of an example data structure used to store configuration information for the techniques provided herein. FIG. 5A shows an example of a user device data structure that associates a user identifier of users with the device identifiers of the user devices associated with the users. The user device data structure also includes a device category for each of the user devices. As discussed in the preceding examples, the user may assign a device category to each of their user devices via a user interface provided by the communication platform 110. The user device data is stored in the configuration datastore 215 on the communication platform 110 and/or the configuration datastore 280 on the user device 105 in some implementations.

FIG. 5B shows an example of a time category data structure that associates each time period among a plurality of time periods with permitted device category information and message category information. The permitted device category information indicates which categories of user devices are permitted to provide notification of received messages during the time period, and the message category information indicates which categories of messages from a plurality of message categories for which the notifications may be generated during the time period.

FIG. 5C shows an example of a message queue data structure that may be used to store message information in the message queue 235 and/or the message queue 265. The message queue data structure associates a message identifier, a message category, and a device identifier with each message. In some implementations, the text of the message is also stored in the message queue data structure.

FIG. 5D shows an example of the time category data structure that includes a hide conversations field. The hide conversations field is used by the communication platform 110 and/or the client device 105 to determine whether to hide conversations associated with message categories other than those permitted to be presented on the client device. If the hide other conversations field is set to a "yes" value, then the conversations associated with message categories other than those that are permitted are hidden on the devices categories listed in the device category permitted field. The delay notification field is used to indicate whether to delay notifications for other message categories. If the delay notifications field is set to no, then the communication platform 110 and/or the client device 105 can present silent notifications for hidden conversations. If the delay notifications field is set to yes, then the communication platform 110 and/or the client deice 105 are not permitted to present silent notifications for conversations that are hidden, and the notifications will be delayed until notifications associated with the category of message associated with the conversation may be presented on a particular category of client device.

In the non-limiting example shown in FIG. 5D, only conversations associated with the work-related urgent message category are permitted to be presented during "focus" hours at work. Conversations not associated with this message category are hidden and notifications associated with conversations associated with other categories are hidden. However, during non-focus hours at work, all conversations associated with work-related conversations are permitted to be presented to the user on work-related device and hybrid work and personal use devices. Furthermore, during non-focus hours at work, conversations associated with urgent personal messages are permitted to be presented on the work-related and hybrid user devices. The notifications are not delayed in this example for conversations associated with other message categories, so silent notifications of messages for conversations for categories of messages are permitted, but these conversations are hidden on the work-related and hybrid devices. However, the user may click on or otherwise actuate these notifications to cause the conversation associated with such a silent notification to be at least temporarily displayed. This approach allows the user to work without interruptions caused by distracting notifications but provides an option to view a message and/or conversation associated with such silent notifications as necessary.

Figure 6A:
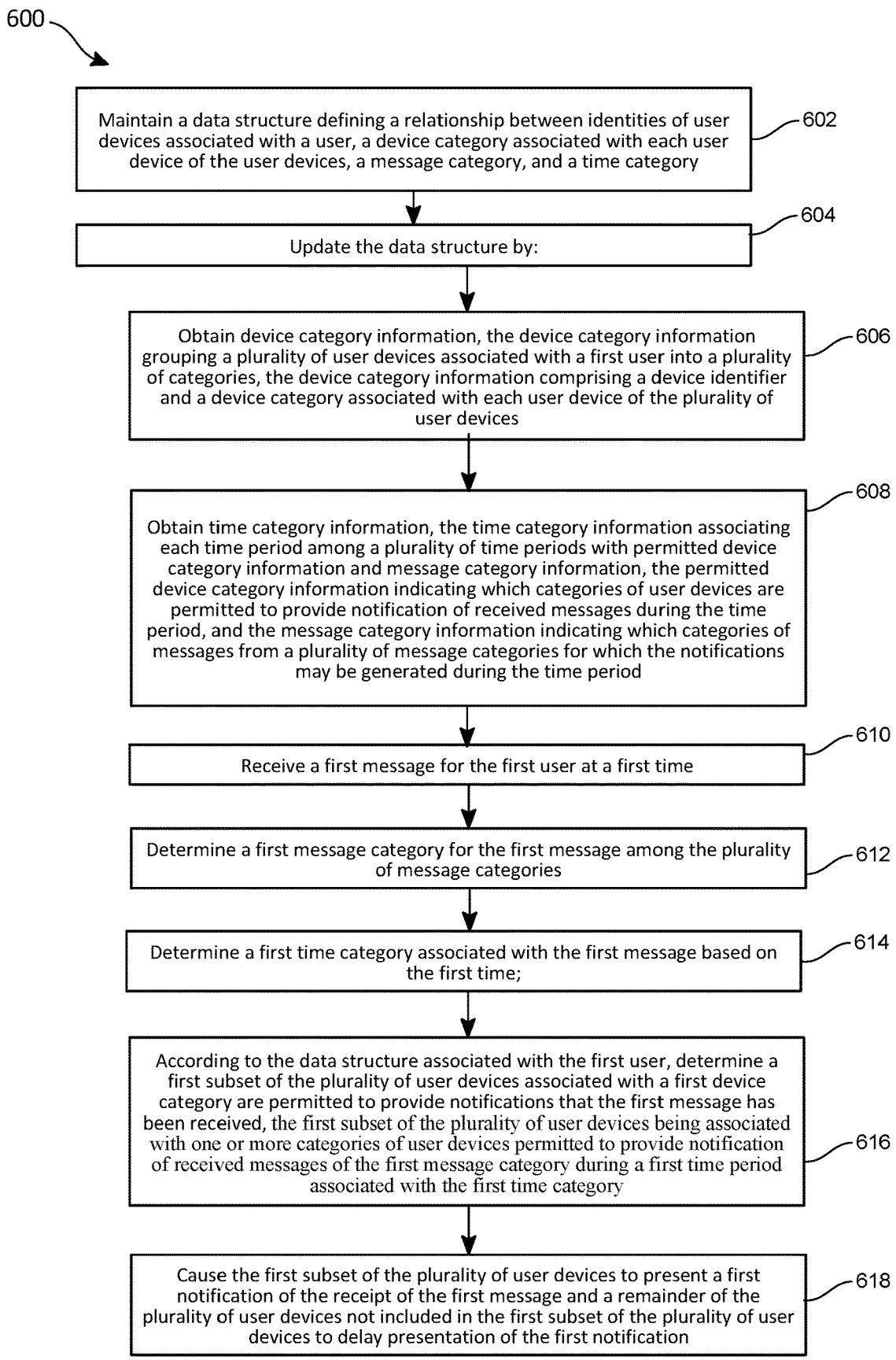
FIG. 6A is a flow chart of an example process for managing notifications presented on the user devices associated with a user.

FIG. 6A is a flow chart of an example process 600 for managing notifications presented on user devices 105 associated with a user. The process 600 may be implemented by the message processing unit 205 of the communication platform 110. The process 600 may be used in implementations in which the communication platform 110 is responsible for determining which notifications may be presented to the user upon receipt of a message and on which of the user devices these notifications may be presented. The process 600 may also be used to determine which notifications must be delayed until a time when such notifications may be presented on the user devices.

The process 600 includes an operation 602 of a maintaining a data structure defining a relationship between identities of user devices associated with a user, a device category associated with each user device of the user devices, and a message category. As discussed in the preceding examples, a data structure, such as the data structures shown in FIGS. 5A-5C may be used to store the data used to configure the categories of messages for which notifications may be presented on specific categories of user devices 105 upon receipt of the message for a particular time category.

The process 600 includes an operation 604 of updating the data structure. The message processing unit 205 and/or other units of the user device 105 may update the data structure. Updating the data structure includes operations 606-618 in some implementations.

The process 600 includes an operation 606 of obtaining device category information, the device category information grouping a plurality of user devices associated with a first user into a plurality of categories. The device category information includes a device identifier and a device category associated with each user device of the plurality of user devices for the user. As discussed in the preceding examples, the user may categorize their user devices into one of a number of categories. In some implementations, the devices may be categories into work-related devices, personal devices, and hybrid devices that are used for a mix of personal and work-related uses. These categories are merely intended to demonstrate the concepts described herein, and other implementations may be used in addition to or instead of one or more of these example categories.

The process 600 includes an operation 608 of obtaining time category information. The time category information associates each time period among a plurality of time periods with permitted device category information and message category information. The permitted device category information indicates which categories of user devices are permitted to provide notification of received messages during the time period, and the message category information indicates which categories of messages from a plurality of message categories for which the notifications may be generated during the time period.

The process 600 includes an operation 610 of receiving a first message for the first user at a first time. The communication platform 110 receives the first message from a user device 105 of a sender of the message in some implementations. The first message may be an email messages, text message, chat message, and/or other type of message. The message processing unit 205 processes the messages that are received to determine whether a notification of the received messages may be presented on the user devices 105 of the first user. In some implementations, the message processing unit 205 stores the message in an incoming message queue 235 for processing before being sent to the user devices 105 of the first user. The first message remains in the message queue 235 until the first message can be sent to all of user devices of the user.

The process 600 includes an operation 612 of determining a first message category for the first message among the plurality of message categories. In some implementations, the user may manually mark a message thread with a category. In such implementations, the user may specify the message category once an initial message is received. The message processing unit 270 may assign default message category to the message thread in some implementations, and the user may assign a different message category if the user does not agree with the default assignment. In other implementations, the message processing unit 205 relies on the content classification model 220 to analyze the first message to determine the first message category.

The process 600 includes an operation 614 of determining a first time category associated with the first message based on the first time. The first time represents the time that the message was received by the user device 105 in some implementations. As discussed in the preceding examples, the user may define periods of times, referred to as time categories, that represent specific times when certain categories of messages may be presented on the user device. In some implementations, the time categories can be associated with a specific day or days of the week. For example, a work time category may be defined for days of the week and the hours which the user typically works, and a personal time category may be defined for the days of the week and times which the user typically is not at work. Other time categories in addition to or instead of one or more of these example time categories are utilized by other implementations.

The process 600 includes an operation 616 of according to the data structure associated with the first user, determining a first subset of the plurality of user devices associated with a first device category are permitted to provide notifications that the first message has been received. The first subset of the plurality of user devices is associated with one or more categories of user devices permitted to provide notification of received messages of the first message category associated with the first time category.

The process 600 includes an operation 618 of causing the first subset of the plurality of user devices to present a first notification of the receipt of the first message and a remainder of the plurality of user devices not included in the first subset of the plurality of user devices to delay presentation of the first notification. The remainder of the plurality of user devices is associated with one or more second device categories which are not permitted to provide notification of received messages of the first message category during the first time period associated with the first time category. In some implementations, the first message is sent to each of the user devices of the first subset of the plurality of user devices and the user devices are configured to present the first notification to the user in response to receiving the first message. The first notification may be presented as a graphical, audible, and/or haptic notification that informs the user that the first message has been received. The type of notification to be presented by the user is configurable by the user in some implementations.

Figure 6B:
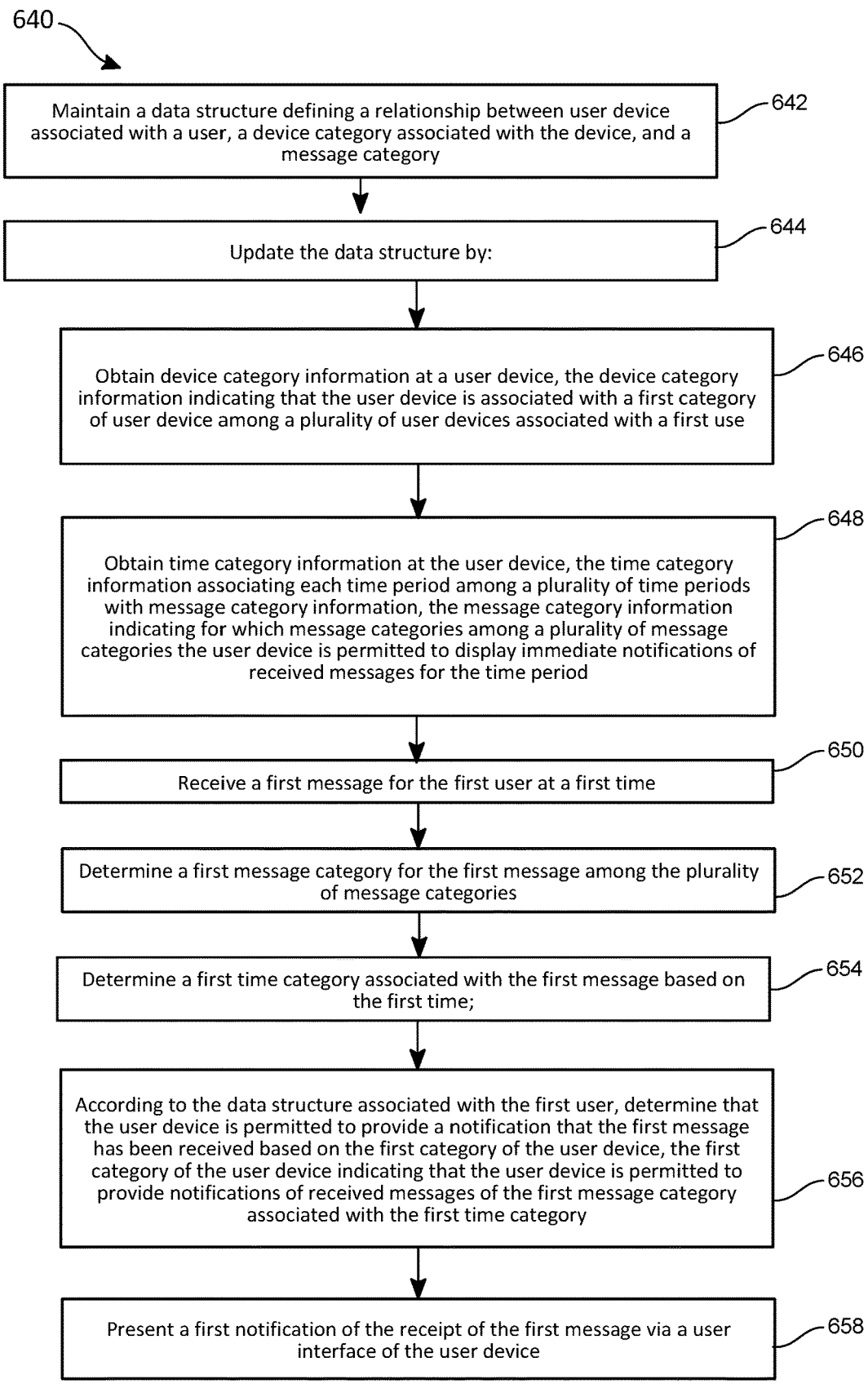
FIG. 6B is a flow chart of an example process for managing notifications presented on the user devices associated with a user.

FIG. 6B is a flow chart of an example process 640 for managing notifications presented on a user device. The process 640 may be implemented on a user device 105 by the message processing unit 270. Such an implementation is shown in FIG. 2B. The process 640 may be used in implementations in which the user devices 105 are responsible for determining which notifications may be presented to the user upon receipt of a message and which notifications must be delayed until a time when such notifications may be presented on the user device.

The process 640 includes an operation 642 of maintaining a data structure defining a relationship between user device associated with a user, a device category associated with the device, and a message category. As discussed in the preceding examples, a data structure, such as the data structures shown in FIGS. 5A-5B may be used to store the data used to configure the categories of messages for which notifications may be presented on the user device 105 upon receipt of the message for a particular time category.

The process 640 includes an operation 644 of updating the data structure. The message processing unit 270 and/or other units of the user device 105 may update the data structure. Updating the data structure includes operations 648-658 in some implementations.

The process 640 includes an operation 646 of obtaining device category information at a user device, the device category information indicating that the user device is associated with a first category of user device among a plurality of user devices associated with a first user. As discussed in the preceding examples, the user may categorize their user devices into one of a number of categories. In some implementations, the devices may be categories into work-related devices, personal devices, and hybrid devices that are used for a mix of personal and work-related uses. These categories are merely intended to demonstrate the concepts described herein, and other implementations may be used in addition to or instead of one or more of these example categories.

The process 640 includes an operation 648 of obtaining time category information at the user device, the time category information associating each time period among a plurality of time periods with message category information. The message category information indicates for which message categories among a plurality of message categories the user device is permitted to display immediate notifications of received messages for the time period.

The process 640 includes an operation 650 of receiving a first message for the first user at a first time. The user device 105 receives the first message from the communication platform 110. The first message may be an email messages, text message, chat message, and/or other type of message.

The message processing unit 270 processes the messages that are received to determine whether a notification of the received messages may be presented on the user device 105. In some implementations, the message processing unit 270 also performs other types of actions on the first message, such as storing the message in an incoming message queue 265 for processing by a native messaging application, such as the native application 255. The message processing unit 270 provides the first message as an input a native application 255 that is configured to process the message in some implementations, and the native application 255 is configured to store the message in an inbox, message queue, message thread, or memory of the user device.

The process 640 includes an operation 652 of determining a first message category for the first message among the plurality of message categories. In some implementations, the user may manually mark a message thread with a category. In such implementations, the user may specify the message category once an initial message is received. The message processing unit 270 may assign default message category to the message thread in some implementations, and the user may assign a different message category if the user does not agree with the default assignment. In other implementations, the message processing unit 270 relies on the content classification model 285 to analyze the first message to determine the first message category.

The process 640 includes an operation 654 of determining a first time category associated with the first message based on the first time. The first time represents the time that the message was received by the user device 105 in some implementations. As discussed in the preceding examples, the user may define periods of times, referred to as time categories, that represent specific times when certain categories of messages may be presented on the user device. In some implementations, the time categories can be associated with a specific day or days of the week. For example, a work time category may be defined for days of the week and the hours which the user typically works, and a personal time category may be defined for the days of the week and times which the user typically is not at work. Other time categories in addition to or instead of one or more of these example time categories are utilized by other implementations.

The process 640 includes an operation 656 of according to the data structure associated with the first user, determining that the user device is permitted to provide a notification that the first message has been received based on the first category of the user device. The first category of the user device indicates that the user device is permitted to provide notifications of received messages of the first message category associated with the first time category. As discussed in the preceding examples, the user device is permitted to provide notifications upon receipt of a certain categories of messages on certain categories of devices at specified times. The delivery of notifications for other categories of messages are delayed until a time when the user device is permitted to present such notifications.

The process 640 includes an operation 658 of presenting a first notification of the receipt of the first message via a user interface of the user device. The first notification may be presented as a graphical, audible, and/or haptic notification that informs the user that the first message has been received. The type of notification to be presented by the user is configurable by the user in some implementations.

Figure 6C:
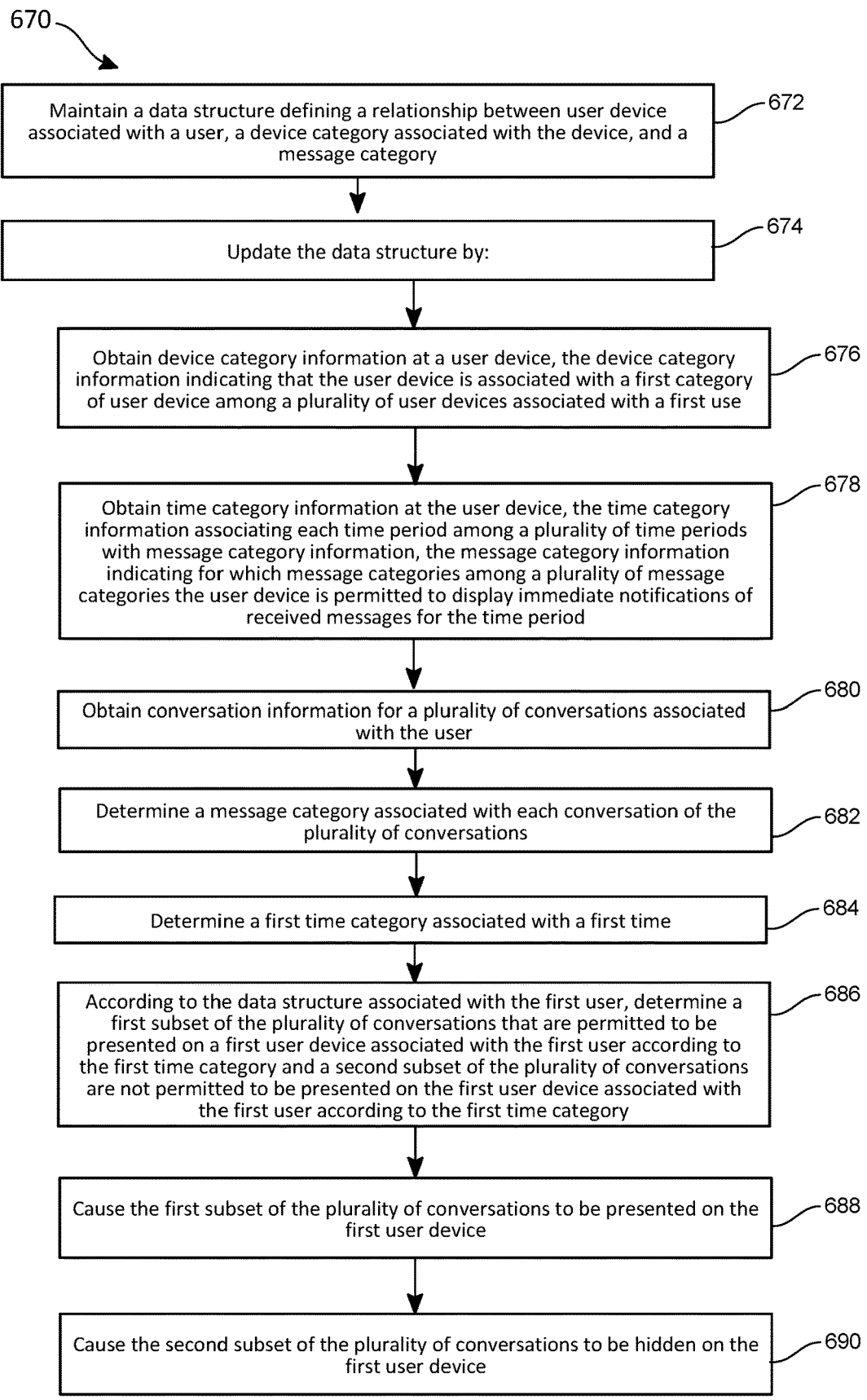
FIG. 6C is a flow chart of an example process for managing conversations presented on a user device.

FIG. 6C is a flow chart of an example process 670 for managing conversations presented on a user device. The process 670 may be implemented on a user device 105 or the communication platform 110 as discussed in the preceding examples.

The process 670 includes an operation 672 of maintaining a data structure defining a relationship between user device associated with a user, a device category associated with the device, and a message category. As discussed in the preceding examples, a data structure, such as the data structures shown in FIGS. 5A-5B may be used to store the data used to configure the categories of messages for which conversations may be presented on the user device 105 based on the category of message associated with the conversation.

The process 670 includes an operation 674 of updating the data structure. The user device 105 or the communication platform 110 may update the data structure. Updating the data structure includes operations 678-688 in some implementations.

The process 640 includes an operation 676 of obtaining device category information, the device category information grouping a plurality of user devices associated with a first user into a plurality of categories. The device category information includes a device identifier and a device category associated with each user device of the plurality of user devices for the user. As discussed in the preceding examples, the user may categorize their user devices into one of a number of categories. In some implementations, the devices may be categories into work-related devices, personal devices, and hybrid devices that are used for a mix of personal and work-related uses. These categories are merely intended to demonstrate the concepts described herein, and other implementations may be used in addition to or instead of one or more of these example categories.

The process 670 includes an operation 678 of obtaining time category information. The time category information associates each time period among a plurality of time periods with permitted device category information and message category information. The permitted device category information indicates which categories of user devices are permitted to provide notification of received messages during the time period, and the message category information indicates which categories of messages from a plurality of message categories for which the notifications may be generated during the time period.

The process 670 includes an operation 680 of obtaining conversation information for a plurality of conversations associated with the user. As discussed in the preceding example, the client device 105 and/or the communication platform 110 may group messages from a message thread into conversations. A conversation may include one or more messages and may include messages from one or more other users communicating with the user. The conversation may include a thread of email messages, text messages, chat messages, and/or other types of messages supported by the communications platform 110 and the client device 105. In some implementations, a copy of the messages and the conversation information for the conversations associated with these messages is stored in a persistent datastore of the communications platform 110. In other implementations, the messages and/or the conversation information is stored in a persistent datastore of the client device 105.

The process 670 includes an operation 682 of determining a message category associated with each conversation of the plurality of conversations. As discussed in the preceding examples, each conversation is categorized based on the category of messages associated with the conversation and the category of the conversation may change over time if the category of messages associated with the conversation change over time. For example, a conversation with a work colleague that was initially categorized as personal may be recategorized as work-related as the subject matter of the conversation changes from topics unrelated to work to work-related topics. A conversation may be analyzed each time a message is received by the communication platform 110 and/or the client device 105 to determine the message category to associate with the message.

The process 670 includes an operation 684 of determining a first time category associated with a first time and an operation 686 of according to the data structure associated with the first user, determining a first subset of the plurality of conversations that are permitted to be presented on a first user device associated with the first user according to the first time category and a second subset of the plurality of conversations are not permitted to be presented on the first user device associated with the first user according to the first time category. As discussed in the preceding examples, the time categories are used to determine which categories of messages and/or categories of conversations may be presented or hidden on a particular user device at a particular time. Each category of user device may be permitted to present specific categories of conversations at specific times. In some implementations, the communication platform 110 and/or the client device 105 are configured to periodically determine whether each of the conversations that the user may access via the browser application 250 and/or the one or more native applications 255 should be visible to the user or hidden depending upon the time of day. In a non-limiting example, the user configures the time category information to cause conversations unrelated to work to be hidden from the user in the browser application 250 and/or the one or more native applications 255 of work-related user devices 105 during work hours to prevent unwanted distractions. Similarly, other categories of messages may be presented to the user or hidden from the user on certain categories of user device at certain times. For example, the user may configure the communication platform 110 or the client device 105 to display personal content on certain hybrid user devices 105, such as their mobile phone, after work hours and to hide work-related conversations on these devices. The techniques herein are not limited to these specific examples. Other implementations are possible that utilize different message categories, time categories, and devices categories. The client device 105 or the communication platform 110 may be scheduled to periodically determine whether the conversations associated with the user may be presented on each category of user device associated with the user. In some implementations, the determinations may be performed at the start of the time period associated with each time category to determine whether each conversation should be presented to the user or hidden from the user on each category of user device and upon receipt of a message associated with each conversation. The communication platform 110 and/or the client device 105 are configured to delay notifications associated with hidden conversations or to present silent notifications for hidden conversations according to the techniques disclosed herein in some implementations to prevent notifications associated with hidden conversations from distracting the user and interrupting user workflow.

The process 670 includes an operation 688 of causing the first subset of the plurality of conversations to be presented on the first user device an operation 690 of causing the second subset of the plurality of conversations to be hidden on the first user device. The conversions that are permitted to be displayed on a particular user device 105 associated with the user are displayed on that category of user device 105 while the other conversations that are not permitted to be displayed on that category of user device are hidden. Other categories of user device associated with the user may be permitted to present a different subset of conversations and hide a different subset of the conversations.

While the preceding examples describe specific time categories, device categories, and message categories, these examples are merely intended to illustrate the techniques described herein. Other implementations may utilize different time categories, device categories, and/or message categories and are not limited to the specific categories shown herein.

The detailed examples of systems, devices, and techniques described in connection with FIGS. 1-6C are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
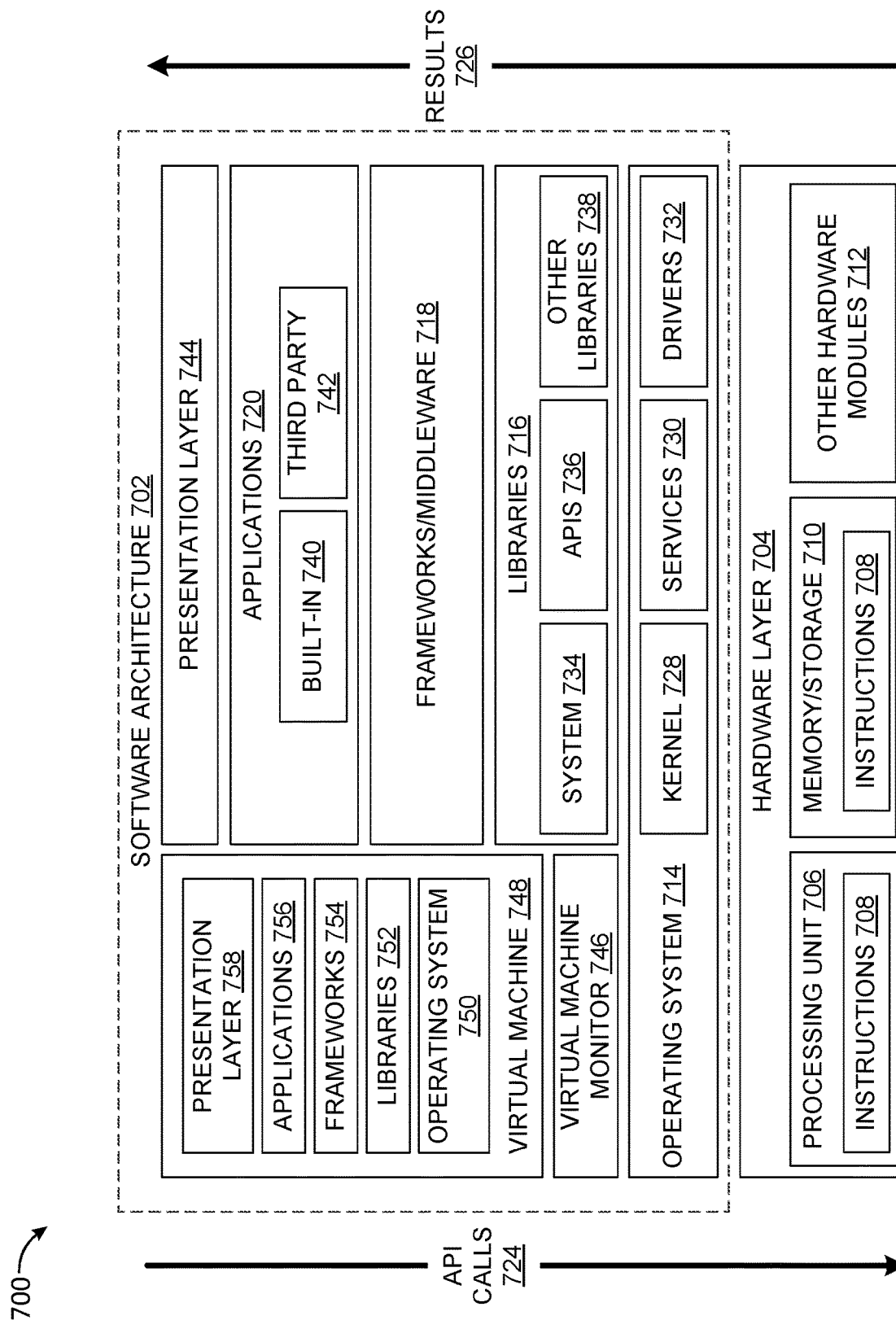
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
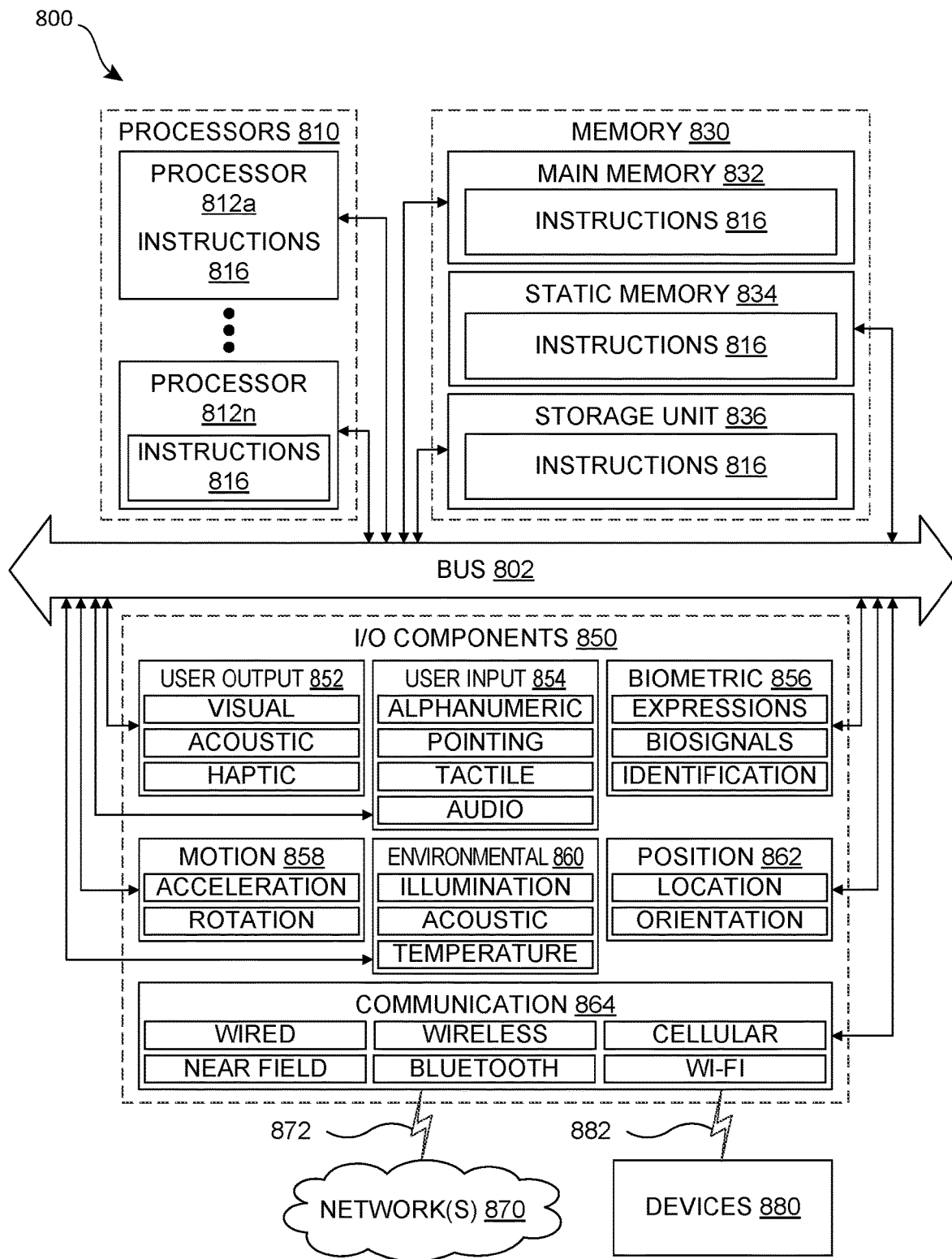
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable medium storing executable instructions that, when executed, cause the processor to perform operations comprising:
maintaining a data structure defining a relationship between identities of user devices associated with a user, a device category associated with each user device of the user devices, a message category, and a time category; and
updating the data structure by:
obtaining device category information, the device category information grouping a plurality of user devices associated with a first user into a plurality of categories, the device category information comprising a device identifier and a device category associated with each user device of the plurality of user devices;
obtaining time category information, the time category information associating each time period among a plurality of time periods with permitted device category information and message category information, the permitted device category information indicating which categories of user devices are permitted to provide notification of received messages during the time period, and the message category information indicating which categories of messages from a plurality of message categories for which the notifications may be generated during the time period;
receiving a first message for the first user at a first time;
determining a first message category for the first message among the plurality of message categories;
determining a first time category associated with the first message based on the first time;
according to the data structure associated with the first user, determining a first subset of the plurality of user devices associated with a first device category are permitted to provide notifications that the first message has been received, the first subset of the plurality of user devices being associated with one or more categories of user devices permitted to provide notification of received messages of the first message category during a first time period associated with the first time category; and
causing the first subset of the plurality of user devices to present a first notification of the receipt of the first message and a remainder of the plurality of user devices not included in the first subset of the plurality of user devices to delay presentation of the first notification, wherein the remainder of the plurality of user devices is associated with one or more second device categories which are not permitted to provide notification of received messages of the first message category during the first time period associated with the first time category.

2. The data processing system of claim 1, wherein determining the first message category further comprises an operation of:
analyzing the first message using a first machine learning model to obtain the first message category, the first machine learning model being trained to analyze a textual message and to categorize the message into a message category from among the plurality of message categories.

3. The data processing system of claim 2, wherein the machine-readable storage medium includes instructions configured to cause the processor to perform operations of:
receiving feedback information from the plurality of user devices indicating whether the first machine learning model correctly classified the first message; and
fine-tuning operating parameters of the first machine learning model based on the feedback information.

4. The data processing system of claim 1, wherein determining the first message category further comprises an operation of:
receiving an indication of the first message category from the user via a user interface of a user device of the plurality of user devices associated with user.

5. The data processing system of claim 1, wherein the machine-readable storage medium includes instructions configured to cause the processor to perform operations of:
causing a second subset of the user devices associated with a second device category to delay presenting the first notification until a second time period in which the second subset of the plurality of the user devices are permitted to present the first notification, the second subset of the plurality of user devices being associated with one or more categories of user devices not permitted to provide notification of received messages of the first message category associated with the first time category.

6. The data processing system of claim 5, wherein causing a second subset of the user devices associated with a second device category to delay presenting the first notification further comprises:
sending the first message to the second subset of the plurality of user devices with an indication to delay presentation of the first notification that the first message has been received until the second time period.

7. The data processing system of claim 5, wherein causing a second subset of the user devices associated with a second device category to delay presenting the first notification further comprises:
sending the first message to the second subset of the plurality of user devices with an indication to store the first message in a pending message queue on the user device until the second time period.

8. The data processing system of claim 5, causing a second subset of the user devices associated with a second device category to delay presenting the first notification further comprises:
causing the first notification to be stored in a notification queue of each user device of the second subset of the plurality of user devices of until the second time period.

9. The data processing system of claim 5, wherein the machine-readable storage medium includes instructions configured to cause the processor to perform operations of:
causing a silent notification to be presented on a display of each user device of the second subset of the plurality of user devices, the silent notification causing the user device to produce no haptic or audible indication.

10. A data processing system comprising:
a processor; and
a machine-readable medium storing executable instructions that, when executed, cause the processor to perform operations comprising:
maintaining a data structure defining a relationship between user device associated with a user, a device category associated with the device, and a message category; and
updating the data structure by:
obtaining device category information at a user device, the device category information indicating that the user device is associated with a first category of user device among a plurality of user devices associated with a first user;
obtaining time category information at the user device, the time category information associating each time period among a plurality of time periods with message category information, the message category information indicating for which message categories among a plurality of message categories the user device is permitted to display immediate notifications of received messages for the time period;
receiving a first message for the first user at a first time;
determining a first message category for the first message among the plurality of message categories;
determining a first time category associated with the first message based on the first time;
according to the data structure associated with the first user, determining that the user device is permitted to provide a notification that the first message has been received based on the first category of the user device, the first category of the user device indicating that the user device is permitted to provide notifications of received messages of the first message category associated with the first time category; and
presenting a first notification of the receipt of the first message via a user interface of the user device.

11. The data processing system of claim 10, wherein determining the first message category further comprises an operation of:
analyzing the first message using a first machine learning model to obtain the first message category, the first machine learning model being trained to analyze a textual message and to categorize the message into a message category from among the plurality of message categories.

12. The data processing system of claim 11, wherein the machine-readable storage medium includes instructions configured to cause the processor to perform operations of:
receiving feedback information indicating whether the first machine learning model correctly classified the first message; and
fine-tuning operating parameters of the first machine learning model based on the feedback information.

13. The data processing system of claim 10, wherein determining the first message category further comprises an operation of:
receiving an indication of the first message category from the user via a user interface of the user device.

14. The data processing system of claim 10, wherein the machine-readable storage medium includes instructions configured to cause the processor to perform operations of:
receiving a second message for the first user at a second time;
analyzing the second message using the first machine learning model to obtain an indication that the second message is associated with a second message category different than the first message category;
determining that the message is associated with the first time category based on the second time;
determining that the user device is not permitted to provide an immediate notification that the first message has been received based on the first category of user device, the time category information, the first time category associated with the second message, and the second message category associated with the second message;
delaying presenting a second notification associated with the second message until a second time period in which the user device is permitted to present the second notification.

15. The data processing system of claim 10, wherein the machine-readable storage medium includes instructions configured to cause the processor to perform operations of:
causing a silent notification to be presented on a display of the user device, the silent notification causing the user device to produce no haptic or audible indication.

16. A data processing system comprising:
a processor; and
a machine-readable medium storing executable instructions that, when executed, cause the processor to perform operations comprising:
maintaining a data structure defining a relationship between identities of user devices associated with a user, a device category associated with each user device of the user devices, a message category, and a time category; and
updating the data structure by:
obtaining device category information, the device category information grouping a plurality of user devices associated with a first user into a plurality of categories, the device category information comprising a device identifier and a device category associated with each user device of the plurality of user devices;
obtaining time category information, the time category information associating each time period among a plurality of time periods with permitted device category information and message category information, the permitted device category information indicating which categories of user devices are permitted to provide notification of received messages during the time period, and the message category information indicating which categories of messages from a plurality of message categories for which the notifications may be generated during the time period;
obtaining conversation information for a plurality of conversations associated with the user;
determining a message category associated with each conversation of the plurality of conversations;
determining a first time category associated with a first time;
according to the data structure associated with the first user, determining a first subset of the plurality of conversations that are permitted to be presented on a first user device associated with the first user according to the first time category and a second subset of the plurality of conversations are not permitted to be presented on the first user device associated with the first user according to the first time category;
causing the first subset of the plurality of conversations to be presented on the first user device; and
causing the second subset of the plurality of conversations to be hidden on the first user device.

17. The data processing system of claim 16, wherein the machine-readable storage medium includes instructions configured to cause the processor to perform operations of:
according to the data structure associated with the first user, determining a third subset of the plurality of conversations that are permitted to be presented on a second user device associated with the first user according to the first time category and a fourth subset of the plurality of conversations are not permitted to be presented on the first user device associated with the first user according to the first time category, wherein the first subset is different than the first subset of the plurality of conversations, and the fourth subset is different than the fourth subset of the plurality of conversations;
causing the second subset of the plurality of conversations to be presented on the second user device
causing the second subset of the plurality of conversations to be hidden on the second user device.

18. The data processing system of claim 16, wherein determining the message category associated with each conversation of the plurality of conversations further comprises:
analyzing a least one message associated with each respective conversation of the plurality of conversations using a first machine learning model to obtain the message category associated with the respective conversation, the first machine learning model being trained to analyze a textual message and to categorize the message into a message category from among the plurality of message categories.

19. The data processing system of claim 18, wherein the machine-readable storage medium includes instructions configured to cause the processor to perform operations of:
receiving feedback information indicating whether the first machine learning model correctly classified a first conversation of the plurality of conversations; and
fine-tuning operating parameters of the first machine learning model based on the feedback information.

20. The data processing system of claim 18, wherein determining the message category associated with each conversation of the plurality of conversations further comprises:
receiving an indication of a first message category from the user via a user interface of the first user device.

* * * * *